(12) United States Patent
Kim et al.

(10) Patent No.: US 9,767,954 B2
(45) Date of Patent: Sep. 19, 2017

(54) WIRELESS ENERGY TRANSMISSION METHOD, APPARATUS, AND SYSTEM

(71) Applicant: Samsung Electronics Co., Ltd., Suwon-si (KR)

(72) Inventors: Sang Joon Kim, Hwaseong-si (KR); Ui Kun Kwon, Hwaseong-si (KR); Seungkeun Yoon, Seoul (KR)

(73) Assignee: Samsung Electronics Co., Ltd., Suwon-si (KR)

(*) Notice: Subject to any disclaimer, the term of this patent is extended or adjusted under 35 U.S.C. 154(b) by 921 days.

(21) Appl. No.: 14/010,810

(22) Filed: Aug. 27, 2013

(65) Prior Publication Data

US 2014/0111017 A1   Apr. 24, 2014

(30) Foreign Application Priority Data

Oct. 23, 2012 (KR) .................. 10-2012-0117826

(51) Int. Cl.
| | | |
|---|---|---|
| H01F 27/42 | (2006.01) |
| H01F 37/00 | (2006.01) |
| H01F 38/00 | (2006.01) |
| H01F 38/14 | (2006.01) |
| H02J 7/00 | (2006.01) |

(Continued)

(52) U.S. Cl.
CPC ............... H01F 38/14 (2013.01); H02J 7/00 (2013.01); H02J 7/025 (2013.01); *G06F 17/15* (2013.01)

(58) Field of Classification Search
CPC ... G06F 17/15; H02J 17/00; H02J 7/00; H02J 7/025; H04L 27/06; H01F 38/14

USPC .... 307/104, 66, 86; 375/344, 226, 296, 297, 375/259; 455/126, 63.1
See application file for complete search history.

(56) References Cited

U.S. PATENT DOCUMENTS

| | | | |
|---|---|---|---|
| 6,535,545 B1 * | 3/2003 | Ben-Bassat | H04B 1/70712 |
| | | | 375/142 |
| 6,845,136 B1 | 1/2005 | Van Der Putten et al. | |

(Continued)

FOREIGN PATENT DOCUMENTS

| | | |
|---|---|---|
| CN | 102027684 A | 4/2011 |
| EP | 1 962 403 A2 | 8/2008 |

(Continued)

OTHER PUBLICATIONS

Extended European Search Report issued on Aug. 8, 2016 in counterpart European Application No. 13849600.5 (7 pages in English).

(Continued)

*Primary Examiner* — Rexford Barnie
*Assistant Examiner* — Jagdeep Dhillon
(74) *Attorney, Agent, or Firm* — NSIP Law

(57) ABSTRACT

Provided are a method and apparatus for wirelessly transmitting energy. A wireless energy transmitter may perform sampling to obtain first samples from an alternating current (AC) signal that is induced at an energy transmission (TX) end, and may correct symbol synchronization based on a difference between a sum of absolute values of the first samples and a sum of absolute values of second samples sampled during a symbol interval in which synchronization matching is performed between a switch of the energy TX end and a switch of the energy RX end.

19 Claims, 21 Drawing Sheets

(51) Int. Cl.
*H02J 7/02* (2016.01)
*G06F 17/15* (2006.01)

(56) References Cited

U.S. PATENT DOCUMENTS

| | | | | |
|---|---|---|---|---|
| 2008/0267274 | A1* | 10/2008 | Tabatabaei | G01R 31/31709 375/226 |
| 2009/0227214 | A1 | 9/2009 | Georgantas et al. | |
| 2009/0284220 | A1* | 11/2009 | Toncich | G06K 7/0008 320/108 |
| 2010/0109443 | A1* | 5/2010 | Cook | H01Q 1/2225 307/104 |
| 2010/0112962 | A1 | 5/2010 | Van Zeijl et al. | |
| 2010/0181961 | A1 | 7/2010 | Novak et al. | |
| 2010/0304699 | A1* | 12/2010 | Walker | H04L 1/20 455/226.3 |
| 2011/0018356 | A1 | 1/2011 | Chatterjee | |
| 2011/0047199 | A1* | 2/2011 | Kim | H04L 7/042 708/422 |
| 2011/0051612 | A1* | 3/2011 | Van Driest | H04B 1/7075 370/252 |
| 2011/0148215 | A1 | 6/2011 | Marzetta et al. | |
| 2011/0254377 | A1 | 10/2011 | Wildmer et al. | |
| 2011/0291489 | A1 | 12/2011 | Tsai et al. | |
| 2012/0161531 | A1 | 6/2012 | Kim | |
| 2012/0161539 | A1* | 6/2012 | Kim | H02J 17/00 307/104 |
| 2012/0314820 | A1* | 12/2012 | Kang | H04L 27/266 375/344 |
| 2012/0322381 | A1* | 12/2012 | Ishizaki | H04W 52/52 455/41.2 |
| 2013/0062964 | A1* | 3/2013 | Chernokalov | H02J 17/00 307/104 |

FOREIGN PATENT DOCUMENTS

| | | |
|---|---|---|
| JP | 2010-74949 A | 4/2010 |
| WO | WO 2010/085701 A2 | 7/2010 |

OTHER PUBLICATIONS

Chinese Office Action issued on Sep. 7, 2016 in counterpart Chinese Application No. 201380055414.8 (7 pages in English, 5 pages in Chinese).

International Search Report dated Jan. 27, 2014 in corresponding International Patent Application No. PCT/KR2013/009405.

* cited by examiner

600

1510
Synchronization
matching

1520
Synchronization
mismatching

1530
Primary synchronization
correction

WIRELESS ENERGY TRANSMISSION METHOD, APPARATUS, AND SYSTEM

CROSS-REFERENCE TO RELATED APPLICATION(S)

This application claims the benefit under 35 U.S.C. §119 (a) of Korean Patent Application No. 10-2012-0117826, filed on Oct. 23, 2012, in the Korean Intellectual Property Office, the entire disclosure of which is incorporated herein by reference.

BACKGROUND

1. Field

The following description relates to an apparatus and method for wirelessly transmitting energy, and a wireless energy transmission system.

2. Description of Related Art

Research on wireless power transmission has been started to overcome issues, such as an increasing inconvenience of wired power supply and limits to existing battery capacities, and also due to an increase in various electronic devices including mobile devices, and the like. In particular, research on near-field wireless power transmission has been conducted. Near-field wireless power transmission refers to wireless power transmission over a short distance between a transmission coil and a reception coil which is sufficiently shorter in comparison to a wavelength in an operation frequency.

Wireless power may be transmitted between devices resonating at the same frequency. A wireless power transmission and reception system using resonance characteristics may include a source configured to supply power, and a target configured to receive the supplied power. When wireless power is transmitted and received, the source and the target may need to share control information otherwise the efficiency of the wireless power transmission may be poor.

SUMMARY

In an aspect, there is provided a wireless energy transmitter, including a sampling unit configured to obtain first samples from an alternating current (AC) signal during a symbol interval, the AC signal being induced at an energy transmission (TX) end, and the symbol interval being used to transmit energy from the energy TX end to an energy reception (RX) end, and a correcting unit configured to correct symbol synchronization based on a difference between a sum of absolute values of the first samples and a sum of absolute values of second samples that are obtained during a symbol interval in which synchronization matching is performed between a switch of the energy TX end and a switch of the energy RX end.

The wireless energy transmitter may further comprise a controller configured to determine whether the symbol synchronization is to be corrected based on a comparison of the sum of the absolute values of the first samples and the sum of the absolute values of the second samples.

The controller may comprise a calculating unit configured to calculate the sum of the absolute values of the first samples and the sum of the absolute values of the second samples, and a comparing unit configured to compare the sum of the absolute values of the first samples with the sum of the absolute values of the second samples.

In response to the sum of the absolute values of the first samples being greater than the sum of the absolute values of the second samples, the controller may determine to correct the symbol synchronization.

In response to the sum of the absolute values of the first samples being less than or equal to the sum of the absolute values of the second samples, the controller may determine to maintain the symbol synchronization.

The correcting unit may control a turn-on timing and a turn-off timing of the switch of the energy TX end, based on the difference between the sum of the absolute values of the first samples and the sum of the absolute values of the second samples.

The correcting unit may reduce a turn-on timing and a turn-off timing of the switch of the energy TX end, for a single symbol interval, based on the difference between the sum of the absolute values of the first samples and the sum of the absolute values of the second samples, and the controller may determine whether the reduced turn-on timing and the reduced turn-off timing are to be corrected, based on a comparison of the sum of the absolute values of the first samples and a sum of absolute values of third samples that are obtained from the AC signal during a next symbol interval.

In response to the sum of the absolute values of the third samples being greater than the sum of the absolute values of the first samples, the correcting unit may increase the previously reduced turn-on timing and the reduced turn-off timing, based on a difference between the sum of the absolute values of the third samples and the sum of the absolute values of the second samples.

The wireless energy transmitter may further comprise a source resonator configured to transmit energy to the energy RX end through mutual resonance between the source resonator and a target resonator of the energy RX end, a power source configured to supply energy to the source resonator, and a switch configured to electrically connect and disconnect the power source to and from the source resonator.

The wireless energy transmitter may further comprise a modulator configured to modulate data based on a turning on and off of the switch, and a demodulator configured to demodulate data received from the energy RX end based on whether the mutual resonance occurs at the energy RX end.

In an aspect, there is provided a wireless energy transmission system, including a wireless energy transmitter configured to transmit energy through mutual resonance between a source resonator and a target resonator, and to correct symbol synchronization based on a sum of absolute values of samples of an alternating current (AC) signal induced at the source resonator, and a wireless energy receiver comprising the target resonator configured to receive energy transmitted by the source resonator through the mutual resonance, and to match the symbol synchronization based on values of samples of an AC signal induced at the target resonator.

The wireless energy transmitter may comprise a sampling unit configured to obtain first samples from the AC signal induced at the source resonator, for each symbol interval, a controller configured to determine whether the symbol synchronization is to be corrected based on a comparison of a sum of absolute values of the first samples and a sum of absolute values of second samples that are obtained during a symbol interval in which the synchronization matching is performed, and a correcting unit configured to correct the symbol synchronization based on a difference between the sum of the absolute values of the first samples and the sum of the absolute values of the second samples.

The wireless energy receiver may comprise a sampling unit configured to perform sampling to obtain first samples from the AC signal induced at the target resonator, for each symbol interval, and a symbol synchronization matching unit configured to match a point in time at which one of the first samples has a largest absolute value as a symbol synchronization point in time.

The wireless energy receiver may further comprise a load that is charged with energy received by the target resonator, a capacitor configured to change a resonant frequency of the target resonator, in response to the capacitor and the target resonator being connected to each other, a switch configured to electrically connect and disconnect the target resonator to and from the load and the capacitor, and a switch controller configured to control an operation of the switch based on the symbol synchronization point in time.

The wireless energy receiver may further comprise a modulator configured to modulate data based on a turning on and off of the switch, and a demodulator configured to demodulate data received from the wireless energy transmitter based on whether the mutual resonance occurs at the wireless energy transmitter.

In an aspect, there is provided a wireless energy transmission method, including obtaining first samples from an alternating current (AC) signal during a symbol interval, the AC signal being induced at an energy transmission (TX) end, and the symbol interval being used to transmit energy from the energy TX end to an energy reception (RX) end, and correcting symbol synchronization based on a difference between a sum of absolute values of the first samples and a sum of absolute values of second samples that are sampled during a symbol interval in which synchronization matching is performed between a switch of the energy TX end and a switch of the energy RX end.

The wireless energy transmission method may further comprise obtaining the second samples from the AC signal prior to obtaining the first samples, calculating the sum of the absolute values of the second samples, calculating the sum of the absolute values of the first samples, comparing the sum of the absolute values of the first samples with the sum of the absolute values of the second samples, and determining whether the symbol synchronization is to be corrected based on a result of the comparing.

The determining may comprise, in response to the sum of the absolute values of the first samples being greater than the sum of the absolute values of the second samples, determining to correct a turn-on timing and a turn-off timing of the switch of the energy TX end.

The correcting may comprise maintaining the turn-on timing and the turn-off timing, in response to the sum of the absolute values of the first samples being less than or equal to the sum of the absolute values of the second samples, and reducing the turn-on timing and the turn-off timing, in proportion to a difference between the sum of the absolute values of the first samples and the sum of the absolute values of the second samples, in response to the sum of the absolute values of the first samples being greater than the sum of the absolute values of the second samples.

The wireless energy transmission method may further comprise obtaining third samples from the AC signal during a next symbol interval, in response to the turn-on timing and the turn-off timing being reduced, calculating a sum of absolute values of the third samples, comparing the sum of the absolute values of the third samples with the sum of the absolute values of the first samples, determining to correct the turn-on timing and the turn-off timing, in response to the sum of the absolute values of the third samples being greater than or equal to the sum of the absolute values of the first samples, and increasing the turn-on timing and the turn-off timing, in proportion to a difference between the sum of the absolute values of the third samples and the sum of the absolute values of the second samples.

Other features and aspects will be apparent from the following detailed description, the drawings, and the claims.

Figure 1:
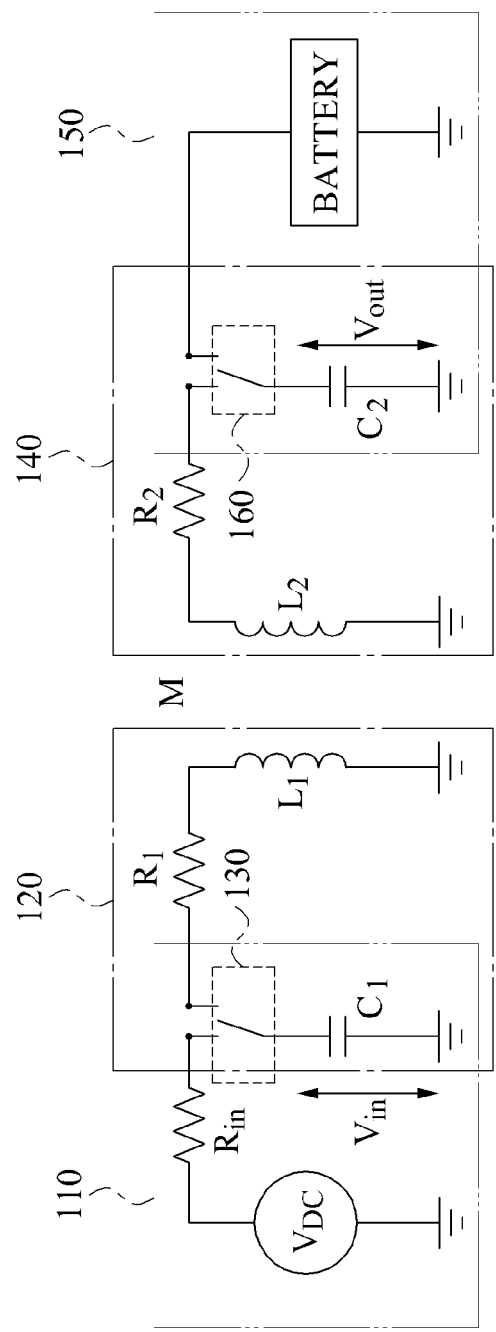
FIG. 1 is a diagram illustrating an example of an equivalent circuit of a wireless energy transmission system.

Throughout the drawings and the detailed description, unless otherwise described, the same drawing reference numerals will be understood to refer to the same elements, features, and structures. The relative size and depiction of these elements may be exaggerated for clarity, illustration, and convenience.

DETAILED DESCRIPTION

The following detailed description is provided to assist the reader in gaining a comprehensive understanding of the methods, apparatuses, and/or systems described herein. Accordingly, various changes, modifications, and equivalents of the methods, apparatuses, and/or systems described herein will be suggested to those of ordinary skill in the art. Also, description of well-known functions and constructions may be omitted for increased clarity and conciseness.

A wireless power transmission system may be applied to various systems which transmit and/or receive wireless power. The wireless power transmission system may be used in a system enabling use of wireless power, for example a mobile phone and charge device, a wireless television (TV), a terminal, and the like. Additionally, the wireless power transmission system may be applicable in a bio-healthcare field, and may be used to remotely transmit power to a device, for example, inserted into a human body, or used to wirelessly transmit power to a bandage-shaped device for measurement of a heart rate.

As another example, the wireless power transmission system may also be applied to a device, such as a sensor with a great constraint on power consumption, and the like. As another example, the wireless power transmission system may be used to remotely control an information storage device without a power source. The wireless power transmission system may be applied to a system that is configured to supply power to an information storage device to remotely operate the information storage device, and to wirelessly request information stored in the information storage device.

The wireless power transmission system may receive energy supplied from a power supply unit, and may store the energy in a source resonator, to generate a signal. The wireless power transmission system may induce the source resonator to self-resonate by powering off a switch that electrically connects the power supply unit to the source resonator. For example, when a target resonator with the same resonant frequency as the source resonator is disposed within a distance that is close enough to resonate with the source resonator that self-resonates, a mutual resonance phenomenon may occur between the source resonator and the target resonator. As a result, power may be wirelessly transferred from the source to the target to thereby charge or otherwise power a load corresponding to the target.

In various examples herein, the source resonator may refer to a resonator that receives energy from a power supply unit, and the target resonator may refer to a resonator that receives energy from the source resonator due to the mutual resonance phenomenon.

FIG. 1 illustrates an example of an equivalent circuit of a wireless energy transmission system. The wireless energy transmission system may be defined as a "resonator isolation (RI) system."

Referring to FIG. 1, the wireless energy transmission system has a source-target structure including a source and a target. The wireless energy transmission system includes a wireless energy transmitter corresponding to the source, and a wireless energy receiver corresponding to the target.

The wireless energy transmitter includes a power input unit 110, a power transmitting unit 120, and a switch unit 130. The power input unit 110 may store energy in a capacitor $C_1$ using a power supply unit. The switch unit 130 may connect the capacitor $C_1$ to the power input unit 110, while the energy is stored in the capacitor $C_1$. Additionally, the switch unit 130 may disconnect the capacitor $C_1$ from the power input unit 110 and may connect the capacitor $C_1$ to the power transmitting unit 120, while the energy stored in the capacitor $C_1$ is discharged. The switch unit 130 may prevent the capacitor $C_1$ from being connected to the power input unit 110 and the power transmitting unit 120 at the same time.

The power transmitting unit 120 may transfer electromagnetic energy to a receiving unit 140. In the example of FIG. 1, the power transmitting unit 120 may transfer power through mutual resonance between a source resonator of the power transmitting unit 120 and a target resonator of the receiving unit 140. The source resonator may include the capacitor $C_1$ and a transmission coil $L_1$, and the target resonator may include a capacitor $C_2$ and a reception coil $L_2$. The level of the mutual resonance between the source resonator and the target resonator may be affected by mutual inductance M.

The power input unit 110 may be modeled to an input voltage $V_{DC}$, an internal resistor $R_{in}$, and the capacitor $C_1$ and the power transmitting unit 120 may be modeled to circuit elements $R_1$, $L_1$, and $C_1$. Additionally, the switch unit 130 may be modeled to a plurality of switches. For example, switches may include an active element enabling an on/off function. In FIG. 1, R, L, and C represent a resistance, an inductance, and a capacitance, respectively. A voltage applied to the capacitor $C_1$ among the input voltage $V_{DC}$ may be represented by $V_{in}$.

In FIG. 1, the wireless energy receiver includes the receiving unit 140, a power output unit 150, and a switch unit 160. The receiving unit 140 may receive electromagnetic energy from the power transmitting unit 120, and may store the received electromagnetic energy in the connected capacitor $C_2$. For example, the switch unit 160 may connect the capacitor $C_2$ to the receiving unit 140, while the energy is stored in the capacitor $C_2$. Further, the switch unit 160 may disconnect the capacitor $C_2$ from the receiving unit 140, and may connect the capacitor $C_2$ to the power output unit 150, while the energy in the capacitor $C_2$ is transferred to a load, for example, a battery. The switch unit 160 may prevent the capacitor $C_2$ from being connected to the receiving unit 140 and the power output unit 150 at the same time.

The reception coil $L_2$ of the receiving unit 140 may receive power through mutual resonance with the transmission coil $L_1$ of the power transmitting unit 120. The received power may be used to charge the capacitor $C_2$ connected to the reception coil $L_2$. The power output unit 150 may transfer the power used to charge the capacitor $C_2$ to the load, for example, the battery. As another example, the power output unit 150 may transfer the power to a load or a target device, instead of the battery.

The receiving unit 140 may be modeled to circuit elements $R_2$, $L_2$, and $C_2$, and the power output unit 150 may be modeled to the connected capacitor $C_2$ and the battery. The switch unit 160 may be modeled to a plurality of switches. Voltage applied to the capacitor $C_2$ among energy received by the reception coil $L_2$ may be represented by $V_{out}$.

The RI system enables power to be transmitted in an example in which the power input unit 110 is physically separated from the power transmitting unit 120 and the receiving unit 140 is physically separated from the power output unit 150. The RI system may have various advantages in comparison to a conventional power transmission method using impedance matching. For example, the RI system may not need a power amplifier, because power may be supplied from a direct current (DC) source directly to a source resonator. Further, the RI system may not require a rectifying operation of a rectifier, because energy is captured from power that is used to charge a capacitor of a receiver in order to charge a battery. Furthermore, a transmission efficiency is not sensitive to a change in a distance between a transmission (TX) end and a reception (RX) end, because there is no need to perform impedance matching. Accordingly, the RI system may be easily extended to a wireless energy transmission system including a plurality of TX ends and a plurality of RX ends.

Figure 2:
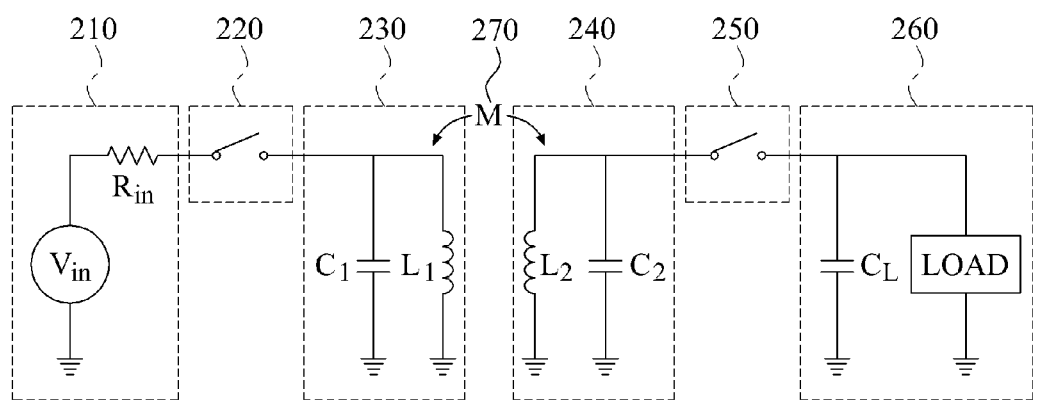
FIG. 2 is a diagram illustrating another example of an equivalent circuit of a wireless energy transmission system.

FIG. 2 illustrates another example of an equivalent circuit of a wireless energy transmission system. That is, FIG. 2 illustrates another example of an RI system.

Referring to FIG. 2, the wireless energy transmission system has a source-target structure including a source and a target. The wireless energy transmission system includes a wireless energy transmitter corresponding to the source, and a wireless energy receiver corresponding to the target.

The wireless energy transmitter includes a power charging unit 210, a control unit 220, and a transmitting unit 230. In this example, the power charging unit 210 includes a power supply unit $V_{in}$, and an internal resistor $R_{in}$. In FIG. 2, a capacitor $C_1$ and an inductor $L_1$ are referred to as a source resonator. The source resonator corresponds to the transmitting unit 230. The transmitting unit 230 may transmit energy stored in the source resonator to the wireless energy receiver, through mutual resonance between the source resonator and a target resonator. The control unit 220 may control a switch to enable power to be supplied from the power charging unit 210 to the source resonator. Voltage may be applied from the power supply unit $V_{in}$ to the capacitor $C_1$, and current may be applied to the inductor $L_1$. For example, when the source resonator reaches a steady state, the voltage applied to the capacitor $C_1$ may have a value of "0", and the current flowing in the inductor $L_1$ may have a value of "$V_{in}/R_{in}$." In the steady state, the inductor $L_1$ may be charged with power using the current applied to the inductor $L_1$.

For example, when the power used to charge the source resonator in the steady state reaches a predetermined value, the control unit 220 may turn off the switch. Information on the predetermined value may be set by the control unit 220. Based on an operation of the switch, the power charging unit 210 may be separated from the transmitting unit 230. In this example, when the switch is turned off, the source resonator may self-resonate between the capacitor $C_1$ and the inductor $L_1$. Energy stored in the source resonator may be transferred to the target resonator, through mutual inductance M 270 between the source resonator and the target resonator. A resonant frequency $f_1$ of the source resonator may be the same as a resonant frequency $f_2$ of the target resonator. Additionally, the resonant frequencies $f_1$ and $f_2$ may be calculated using the following Equation 1:

$$f_1 = \frac{1}{2\pi\sqrt{L_1 C_1}}, f_2 = \frac{1}{2\pi\sqrt{L_2 C_2}} \quad \text{[Equation 1]}$$

The wireless energy receiver includes a charging unit 240, a control unit 250, and a power output unit 260. In FIG. 2, a capacitor $C_2$ and an inductor $L_2$ are referred to as a source resonator. The target resonator corresponds to the charging unit 240. During mutual resonance between the source resonator and the target resonator, the source resonator may be separated from the power supply unit $V_{in}$, and the target resonator may be separated from a load and a capacitor $C_L$. The capacitor $C_2$ and the inductor $L_2$ of the charging unit 240 may be charged with power through the mutual resonance.

To charge the target resonator with power, the control unit 250 may control a switch off (i.e. open). For example, when the switch is turned off, the source resonator and the target resonator may resonate with each other, because the target resonator has the same resonant frequency as the source resonator. When the power used to charge the target resonator reaches a predetermined value, the control unit 250 may power the switch on (i.e. closed). Information on the predetermined value may be set by the control unit 250. By powering the switch on, the capacitor $C_L$ may be connected to the charging unit 240, and the resonant frequency of the target resonator may be changed. A value of the changed resonant frequency of the target resonator may be obtained using the following Equation 2:

$$f'_2 = \frac{1}{2\pi\sqrt{L_2(C_2 + C_L)}} \quad \text{[Equation 2]}$$

Accordingly, the resonant frequency $f_1$ of the source resonator may become different from the resonant frequency $f_2$ of the target resonator, which may cause the mutual resonance between the source resonator and the target resonator to be terminated. For example, when $f_2'$ is smaller than $f_2$ based on a Q-factor of the target resonator, a mutual resonance channel may be removed. Additionally, the power output unit 260 may transfer power used to charge the capacitor $C_2$ and the inductor $L_2$ to a load. For example, the power output unit 260 may transfer the power using a scheme suitable for the load. As another example, the power output unit 260 may regulate voltage to a rated voltage that is required by the load, and may transfer power.

When a value of the power used to charge the target resonator is less than a predetermined value, the control unit 250 may turn off the switch. When the resonant frequency $f_1$ of the source resonator becomes near to or identical to the resonant frequency $f_2$ of the target resonator, due to the powering off of the switch, the charging unit 240 may recharge the target resonator with power using the mutual resonance between the source resonator and the target resonator.

During the mutual resonance between the source resonator and the target resonator, the switch may not be connected. Accordingly, it is possible to prevent transmission efficiency from being reduced due to a connection to the switch.

A scheme of FIG. 2 for controlling a point in time of capturing energy stored in a target resonator may be performed more easily than a scheme of FIG. 1 for transferring energy stored in a capacitor. In the scheme of FIG. 1, a wireless power receiver may capture the energy in the capacitor. However, in a scheme of FIG. 2 for changing a resonant frequency and capturing energy, energy stored in an inductor and a capacitor of a target resonator may be captured. Accordingly, a degree of freedom for the point in time of capturing energy may be improved.

To transmit power or data, a TX end in the RI system may repeatedly charge a source resonator with energy and discharge energy through a connection to a switch. In various examples herein, a single charge and discharge of energy may be defined as a single symbol. To receive energy or data from the TX end, an RX end in the RI system may operate a switch of the RX end, based on an operation period of a switch of the TX end that repeatedly performs charging and discharging.

To receive power or data from the TX end without an error, the RX end may know when the switch of the TX end is turned off, when the switch of the TX end is turned on, when the mutual resonance is started, and when energy stored in a target resonator has a peak value. An operation of acquiring information regarding an on/off time of the switch of the TX end, and of adjusting an on/off time of the switch of the RX end based on the acquired information is referred to as "time synchronization."

To transfer information, the RI system may use a mutual resonance phenomenon between a source resonator and a target resonator. For example, the TX end may induce a phenomenon in which mutual resonance occurs for a predetermined time interval, or a phenomenon in which mutual resonance does not occur for the predetermined time interval, through an operation in which energy is supplied or is not supplied to the source resonator for the predetermined time interval, and may assign information to each of the phenomena. For example, the TX end may assign a bit "1" to the phenomenon in which the mutual resonance occurs, and may assign a bit "0" to the phenomenon in which the mutual resonance does not occur. The predetermined time interval may be defined, for example, to be a single symbol.

The RX end may induce a phenomenon in which mutual resonance occurs for a predetermined time interval, or a phenomenon in which mutual resonance does not occur for the predetermined time interval, through an operation in which a resonant frequency of the target resonator is matched to or is not matched to a resonant frequency of the source resonator. The RX end may assign information to each of the phenomena. For example, the RX end may assign a bit "1" to the phenomenon in which the mutual resonance occurs, and may assign a bit "0" to the phenomenon in which the mutual resonance does not occur.

In a scheme of transferring information in a symbol unit, symbols may be required to be synchronized first. To synchronize symbols, the RX end may perform synchronization matching. For example, when the synchronization matching is performed in the RX end, data may be bidirectionally transmitted between the TX end and the RX end by a protocol that is set in advance.

When a predetermined period of time elapses after the synchronization matching, synchronization mismatching may occur, because a period of an oscillator of a TX system and a period of an oscillator of an RX system are finely different from each other. Accordingly, to correct the synchronization mismatching, re-matching may be periodically performed, or synchronization may be corrected. Typically, both re-matching and correction of the synchronization may be performed in the RX end. To perform synchronization matching and re-matching, or to correct synchronization in the RX end, channel monitoring may be continuously performed, and an additional process for re-matching and correction of synchronization may be performed, which may cause a problem by increasing an amount of power consumed in the RX end.

Figure 3:
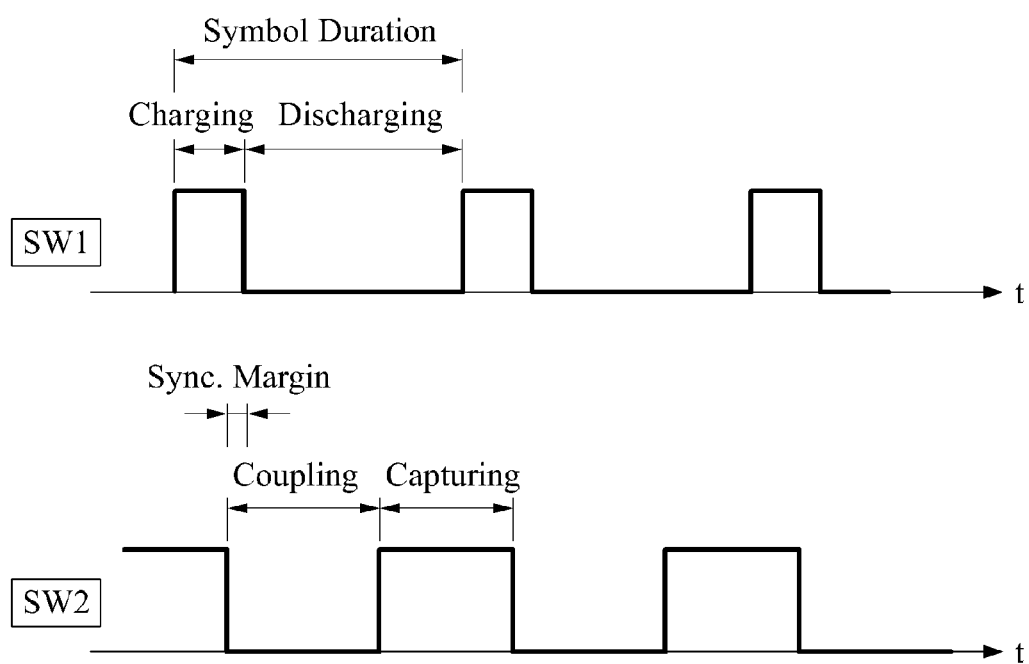
FIG. 3 is a diagram illustrating an example of an operation timing of a switch of each of a transmission (TX) end and a reception (RX) end in a wireless energy transmission system.

FIG. 3 illustrates an example of an operation timing of a switch of each of a TX end and an RX end in a wireless energy transmission system.

Referring to FIG. 3, the TX end may transmit energy to the RX end by repeating an operation of charging and discharging. In various examples herein, a single charge and discharge of energy are referred as a single symbol.

To receive energy from the TX end, the RX end may turn off a switch SW2 of the RX end, and may prepare for mutual resonance with the TX end, prior to a predetermined time (namely, a synchronization margin) in which the charging is switched to the discharging due to turning off of a switch SW1 of the TX end.

For example, when mutual resonance is started, a target resonator of the RX end may be charged with energy. In this case, mutual resonance may be expressed by coupling between a source resonator and a target resonator. The RX end may turn on the switch SW2 at a point in time at which energy stored in the target resonator has a peak value or has a value that meets a predetermined threshold, may change a resonant frequency of the target resonator to be different from a resonant frequency of the source resonator, and may capture the energy stored in the target resonator. The RX end may perform synchronization matching with the switch SW1, by controlling an on/off time point of the switch SW2, based on a value of the energy stored in the target resonator.

Figure 4:
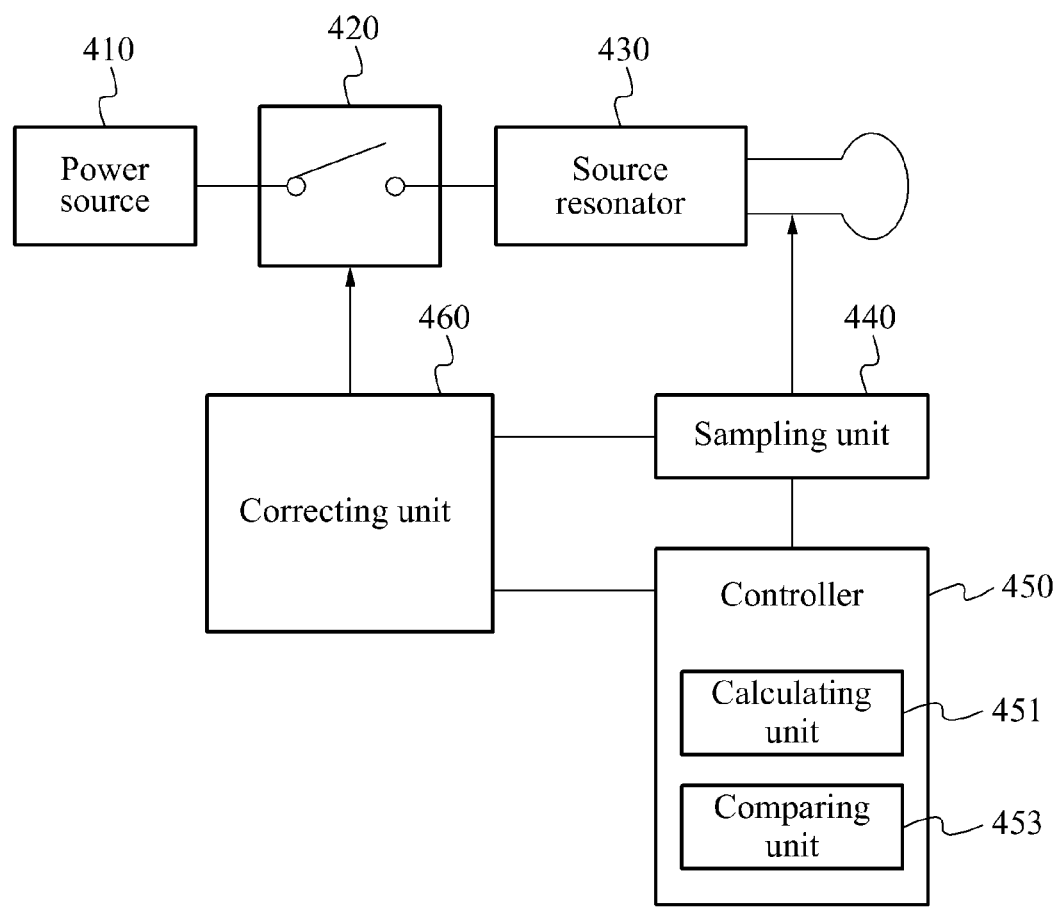
FIG. 4 is a diagram illustrating an example of a wireless energy transmitter.

FIG. 4 illustrates an example of a wireless energy transmitter.

Referring to FIG. 4, the wireless energy transmitter includes a sampling unit 440, a controller 450, and a correcting unit 460. Additionally, the wireless energy transmitter may further include a power source 410, a switch 420, and a source resonator 430. In various examples herein, the terms "wireless energy transmitter" and "wireless energy receiver" may be used interchangeably with an "energy TX end," and an "energy RX end," respectively.

The sampling unit 440 may perform sampling to obtain first samples from an alternating current (AC) signal, during a symbol interval. The AC signal may be induced to an energy TX end. The symbol interval may be used as a criterion to transmit energy from the energy TX end to an energy RX end. For example, the symbol interval may be defined as a predetermined time in which the energy TX end transmits energy to the energy RX end based on an operation of a switch. Additionally, the symbol interval may refer to a time in which the switch 420 of the energy TX end is turned on once and turned off once and is maintained in an on state and off state.

The sampling unit 440 may perform sampling to obtain samples from an AC signal induced to the energy TX end, for each symbol interval. When mutual resonance occurs between the source resonator 430 and a target resonator (not illustrated) of the energy RX end, an AC voltage may be induced to the source resonator 430. The sampling unit 440 may perform sampling to obtain first samples from the induced AC voltage signal. For example, the sampling unit 440 may include an analog-to-digital converter (ADC). The sampling unit 440 may sample second samples that are sampled in a symbol interval in which the synchronization matching is performed.

According to various aspects, the correcting unit 460 may correct symbol synchronization, based on a difference between a sum of absolute values of the first samples and a sum of absolute values of second samples. The synchronization matching may be performed between the switch 420 of the energy TX end and a switch (not illustrated) of the energy RX end. For example, the synchronization matching may refer to turning off the switch of the energy RX end within a predetermined margin time when the switch 420 is turned off. Accordingly, initial synchronization matching may be performed in the energy RX end. In various examples herein, "synchronization matching" refers to synchronization between an operation timing of a switch of a TX end and an operation timing of a switch of an RX end, and "synchronization mismatching" refers to a difference between the synchronized operation timings.

The correcting unit 460 may reduce or increase a time in which the switch 420 is to be turned on, and a time in which the switch 420 is to be turned off, in proportion to the difference between the sum of the absolute values of the first samples and the sum of the absolute values of the second samples. For example, the first samples may each have a voltage value of an AC voltage signal, and accordingly, the sum of the absolute values of the first samples may refer to a sum of absolute values of voltage values of the first samples. Similarly, the sum of the absolute values of the second samples may refer to a sum of absolute values of voltage values of the second samples.

The correcting unit 460 may adjust the time in which the switch 420 is to be turned on, and the time in which the switch 420 is to be turned off, and may control a length of a symbol interval, that is, a symbol duration. For example, the correcting unit 460 may adjust only a length of a single symbol interval. Non-corrected symbol interval other than the single symbol interval may have predetermined lengths.

The controller 450 may determine whether symbol synchronization is to be corrected, based on a comparison between the sum of the absolute values of the first samples with the sum of the absolute values of the second samples. For example, a sum of absolute values of the second samples sampled in an interval in which symbol synchronization is matched may have a small value, in comparison to when the sum is calculated in another symbol interval. When the sum of the absolute values of the first samples is greater than the sum of the absolute values of the second samples, the symbol synchronization may be determined not to be matched.

In the example of FIG. 4 the controller 450 includes a calculating unit 451 and a comparing unit 453. The calculating unit 451 may calculate the sum of the absolute values of the first samples, and the sum of the absolute values of the second samples. For example, the calculating unit 451 may calculate a sum of absolute values of samples obtained by the sampling unit 440.

The comparing unit 453 may compare the sum of the absolute values of the first samples with the sum of the absolute values of the second samples. For example, when the sum of the absolute values of the first samples is greater than the sum of the absolute values of the second samples, the comparing unit 453 may output a bit value such as "1," and when the sum of the absolute values of the first samples is less than or equal to the sum of the absolute values of the second samples, the comparing unit 453 may output a bit value such as "0." As another example, when the sum of the absolute values of the first samples is greater than the sum of the absolute values of the second samples, the comparing unit 453 may output a bit value "0," and when the sum of the absolute values of the first samples is less than or equal to the sum of the absolute values of the second samples, the comparing unit 453 may output a bit value "1."

In an example in which the sum of the absolute values of the first samples is greater than the sum of the absolute values of the second samples, the controller 450 may determine to correct the symbol synchronization. According to various aspects, a bit output from the comparing unit 453 may be set in advance between the comparing unit 453 and the controller 450.

In another example in which the sum of the absolute values of the first samples is less than or equal to the sum of the absolute values of the second samples, the controller 450 may determine to maintain a current symbol synchronization, because the symbol synchronization may be determined to be matched.

The correcting unit 460 may control a time for turning the switch 420 on and off, based on the difference between the sum of the absolute values of the first samples and the sum of the absolute values of the second samples. In this example, the turning of the switch on and off may refer to a timing to turn the switch 420 on, and a timing to turn the switch 420 off, respectively, and may refer to a time in which the switch 420 is maintained as on, and a time in which the switch 420 is maintained as off, respectively.

For example, the correcting unit 460 may control the turn-on timing of the switch 420, based on the difference between the sum of the absolute values of the first samples and the sum of the absolute values of the second samples. In this example, the turn-on timing may be changed while the turn-off timing of the switch 420 may remain unchanged. As another example, the correcting unit 460 may control the turn-off timing of the switch 420, based on the difference between the sum of the absolute values of the first samples and the sum of the absolute values of the second samples. In this example, the turn-off timing may be changed while the turn-on timing of the switch 420 may remain unchanged.

For example, the correcting unit 460 may reduce both the turn-on timing and the turn-off timing of the switch 420, for a single symbol interval, based on the difference between the sum of the absolute values of the first samples and the sum of the absolute values of the second samples. In this example, the controller 450 may determine whether the turn-on timing and the turn-off timing of the switch 420 that are reduced in a previous symbol interval are to be corrected, based on a comparison of the sum of the absolute values of the first samples with a sum of absolute values of third samples sampled from an AC signal induced to the energy TX end in a next symbol interval.

The sampling unit 440 may perform sampling to obtain the third samples in the next symbol interval. The calculating unit 451 may calculate the sum of the absolute values of the third samples. The comparing unit 453 may compare the sum of the absolute values of the third samples with the sum of the absolute values of the first samples.

For example, when the sum of the absolute values of the third samples is greater than the sum of the absolute values of the first samples, the controller 450 may determine to correct the turn-on timing and the turn-off timing of the switch 420 that are reduced in the previous symbol interval. In this example, the correcting unit 460 may increase the previously reduced turn-on timing and the reduced turn-off timing, based on a difference between the sum of the absolute values of the third samples and the sum of the absolute values of the second samples.

The source resonator 430 may transmit energy to the energy RX end, through mutual resonance with the target resonator. The power source 410 may supply energy to the source resonator 430. The switch 420 may electrically connect or disconnect the power source 410 to and from the source resonator 430. The switch 420 may be operated, based on control by the correcting unit 460.

Figure 5:
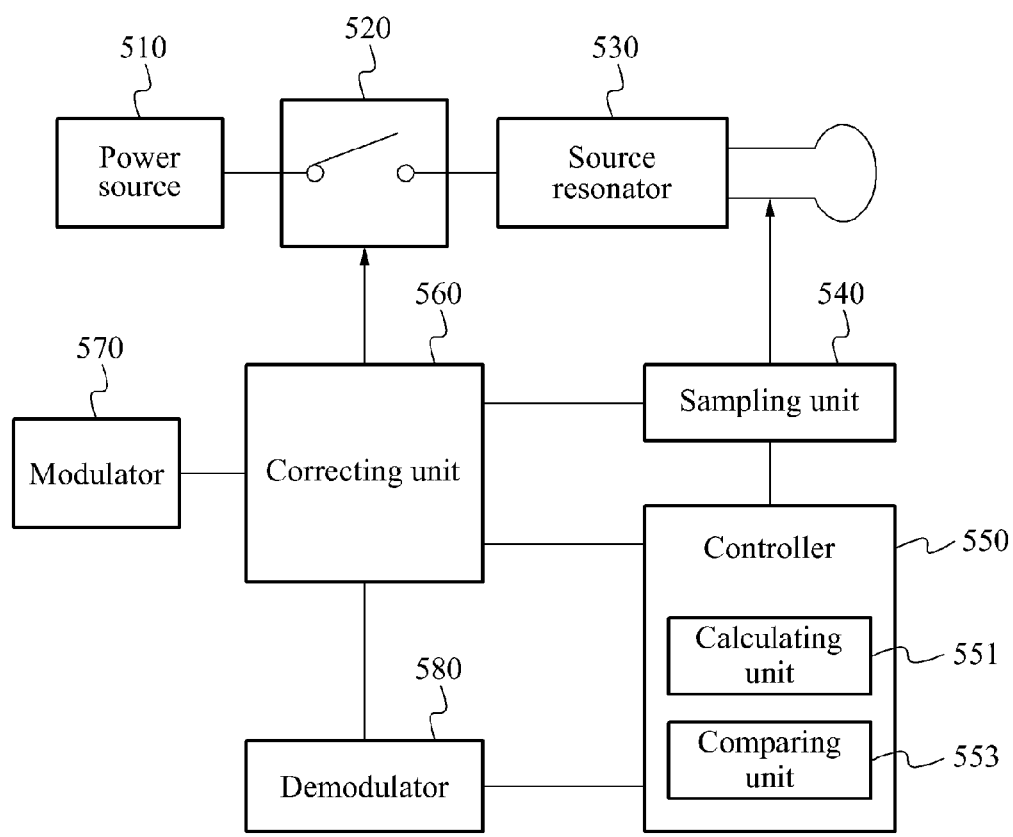
FIG. 5 is a diagram illustrating another example of a wireless energy transmitter.

FIG. 5 illustrates another example of a wireless energy transmitter.

Referring to FIG. 5, in this example, the wireless energy transmitter further includes a modulator 570 and a demodulator 580. The sampling unit 540, the controller 550, and the correcting unit 560 may perform the same or similar operations as the units previously described with reference to FIG. 4. Accordingly, redundant description is omitted.

In this example, the modulator 570 may modulate data based on turning on/off of the switch 520. Whether energy is to be supplied from the power source 510 to the source resonator 530 may be determined based on whether the switch is on or off. Additionally, based on the turning on/off of the switch 520, whether the source resonator 530 self-resonates may be determined.

For example, the modulator 570 may modulate data, by adjusting an amount of energy transmitted by the source resonator 530 during a symbol interval. Different data may be transmitted based on the amount of the transmitted energy.

The demodulator 580 may demodulate data that is received from the energy RX end, based on whether the mutual resonance occurs between the source resonator 530 and the target resonator by the energy RX end. The energy RX end may change a resonant frequency of the target resonator, may determine whether the mutual resonance occurs, and may modulate the data. In this example, the demodulator 580 may demodulate data, based on whether the mutual resonance occurs by the energy RX end.

The controller 550 may perform an overall control of the wireless energy transmitter of FIG. 5, and may perform one or more functions of the sampling unit 540, the correcting unit 560, the modulator 570 and the demodulator 580.

Figure 6:
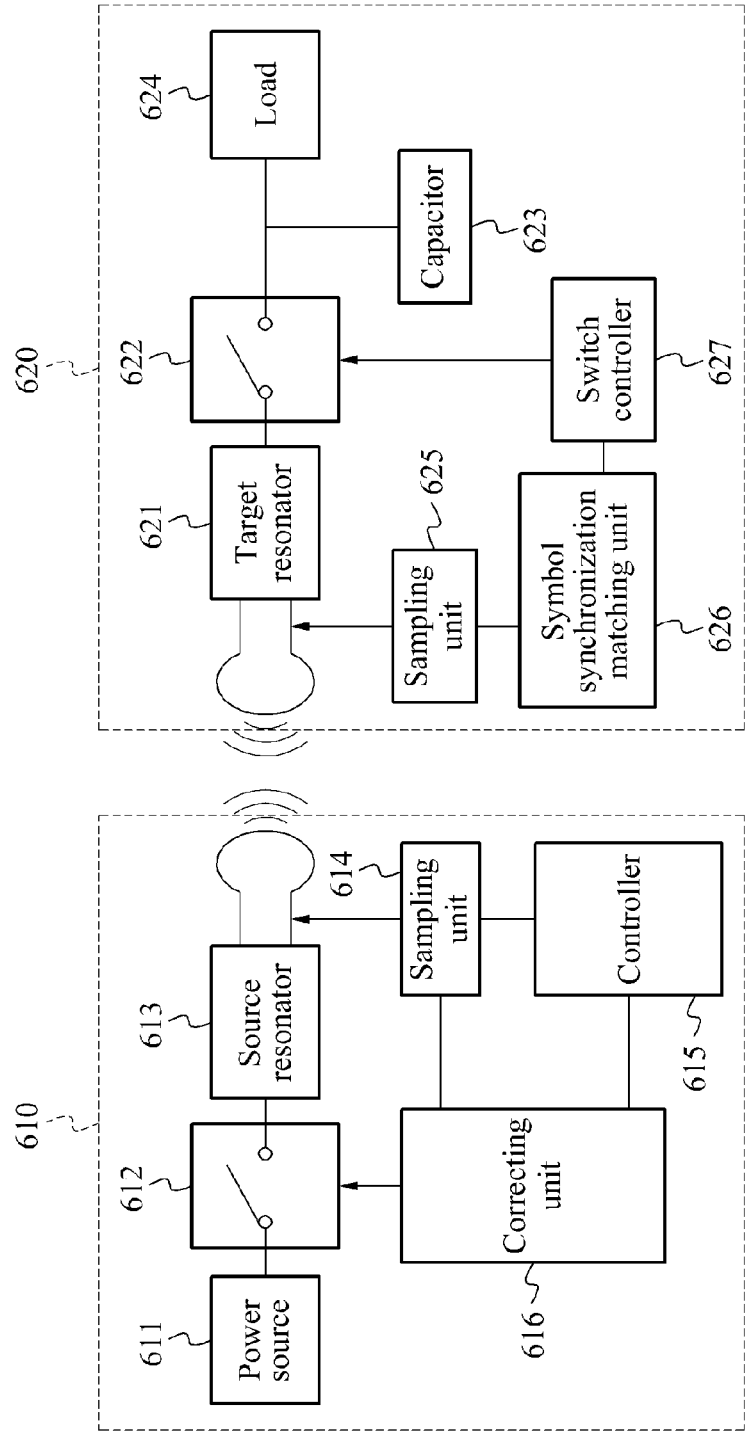
FIG. 6 is a diagram illustrating an example of a wireless energy transmission system.

FIG. 6 illustrates an example of a wireless energy transmission system.

Referring to FIG. 6, a wireless energy transmission system 600 includes a wireless energy transmitter 610 and a wireless energy receiver 620.

The wireless energy transmitter 610 may transmit energy through mutual resonance between a source resonator 613 and a target resonator 621, and may correct symbol synchronization based on a sum of absolute values of samples of an AC signal induced through the source resonator 613. In this example, the wireless energy transmitter 610 includes a power source 611, a switch 612, the source resonator 613, a sampling unit 614, a controller 615, and a correcting unit 616. The sampling unit 614 may perform sampling to obtain first samples from the AC signal induced through the source resonator 613, for each symbol interval.

The controller 615 may determine whether symbol synchronization is to be corrected, based on a comparison of a sum of absolute values of the first samples with a sum of absolute values of second samples. For example, when the sum of the absolute values of the first samples is greater than the sum of the absolute values of the second samples, the controller 615 may determine to correct the symbol synchronization.

The correcting unit 616 may correct the symbol synchronization, based on a difference between the sum of the absolute values of the first samples and the sum of the absolute values of the second samples. The correcting unit 616 may adjust a turn-on timing and a turn-off timing of the switch 612. For example, the correcting unit 616 may reduce the turn-on timing and the turn-off timing of the switch 612. For example, when a sum of absolute values of samples in a next symbol interval is equal to or greater than a sum of absolute values of samples in a current symbol interval, the correcting unit 616 may increase the turn-on timing and the turn-off timing of the switch 612.

The power source 611 may supply energy to the source resonator 613, when the switch 612 is turned on.

The wireless energy receiver 620 may receive energy transmitted by the source resonator 613, using the target resonator 621, through mutual resonance, and may match the symbol synchronization based on values of samples of an AC signal induced to the target resonator 621. In this example, the wireless energy receiver 620 may include the target resonator 621, a switch 622, a capacitor 623, a load 624, a sampling unit 625, a symbol synchronization matching unit 626, and a switch controller 627.

The sampling unit 625 may perform sampling to obtain first samples from the AC signal induced to the target resonator 621, for each symbol interval. The induced AC signal may refer to an AC voltage signal.

The symbol synchronization matching unit 626 may match a point in time at which one of the first samples has a largest absolute value as a symbol synchronization time point. For example, the symbol synchronization matching unit 626 may match a point in time at which one of the first samples has a largest voltage value as a symbol synchronization time point. The switch 622 may electrically connect or disconnect the target resonator 621 to and from the load 624 and the capacitor 623.

The capacitor 623 may change a resonant frequency of the target resonator 621, when the target resonator 621 and the capacitor 623 are connected to each other. For example, the resonant frequency of the target resonator 621 may be determined by an inductance and a capacitance of the target resonator 621, because when the target resonator 621 is connected to the capacitor 623, the capacitance may be affected.

The load 624 may be charged with energy received by the target resonator 621. For example, when the switch 622 is turned on and the target resonator 621 is connected to the load 624, the load 624 may be charged with energy stored in the target resonator 621.

The switch controller 627 may control the switch 622, based on a symbol synchronization time point. For example, the switch controller 627 may control the switch 622 to be turned on in a symbol synchronization time point.

Figure 7:
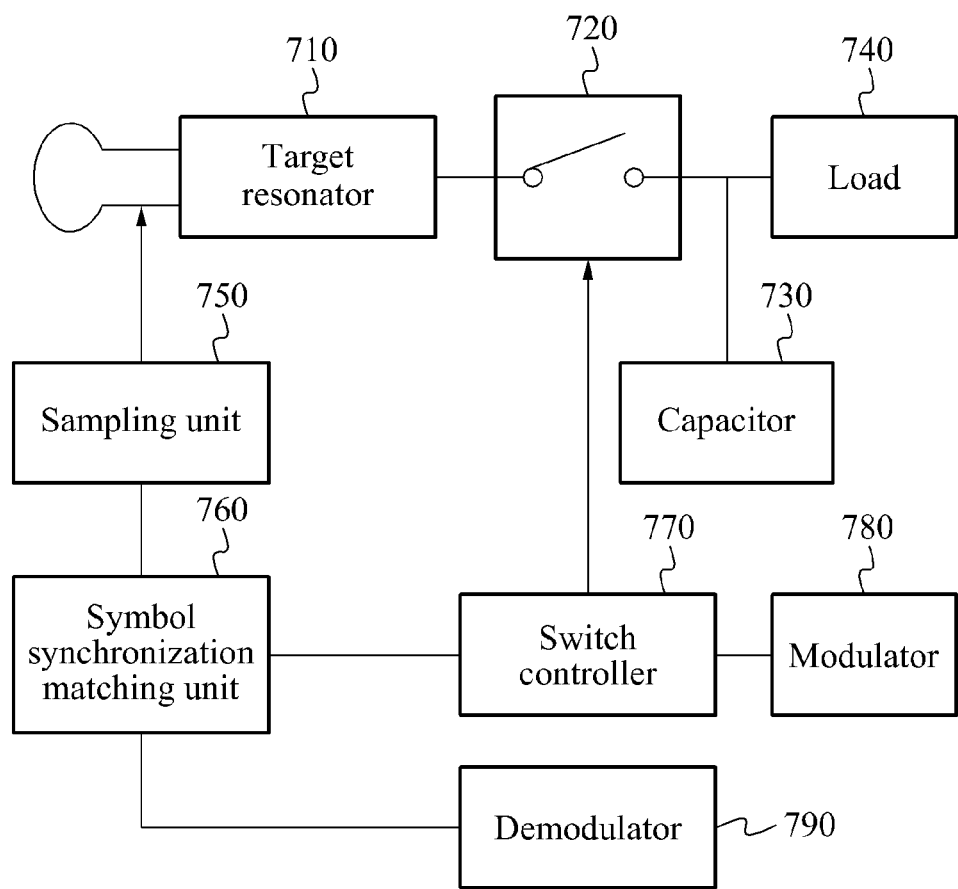
FIG. 7 is a diagram illustrating an example of a wireless energy receiver.

FIG. 7 illustrates an example of a wireless energy receiver.

Referring to FIG. 7, the wireless energy receiver includes a target resonator 710, a switch 720, a capacitor 730, a load 740, a sampling unit 750, a symbol synchronization matching unit 760, and a switch controller 770. Additionally, the wireless energy receiver further includes a modulator 780 and a demodulator 790.

The sampling unit 750 may perform sampling to obtain first samples from an AC signal induced through the target resonator 710, during each symbol interval. The induced AC signal may refer to an AC voltage signal.

The symbol synchronization matching unit 760 may match a point in time at which one of the first samples has a largest absolute value as a symbol synchronization time point. For example, the symbol synchronization matching unit 760 may match a point in time at which one of the first samples has a largest voltage value as a symbol synchronization time point.

The switch controller 770 may control an operation of the switch 720, based on a symbol synchronization time point. For example, the switch controller 770 may control the switch 720 to be turned on at a symbol synchronization time point. In an example in which a predetermined symbol duration elapses, the switch controller 770 may turn the switch 720 off. When the switch 720 is turned off, the target resonator 710 may self-resonate and resonate with a source resonator (not illustrated). The switch 720 may electrically connect or disconnect the target resonator 710 to and from the load 740 and the capacitor 730.

The capacitor 730 may change a resonant frequency of the target resonator 710, when the target resonator 710 and the capacitor 710 are connected to each other. For example, the resonant frequency of the target resonator 710 may be determined by an inductance and a capacitance of the target resonator 710, because when the target resonator 710 is connected to the capacitor 730, the capacitance may be affected.

The load 740 may be charged with energy received by the target resonator 710. For example, when the switch 720 is turned on and the target resonator 710 is connected to the load 740, the load 740 may be charged with energy stored in the target resonator 710.

The modulator 780 may modulate data based on turning on/off of the switch 720. For example, based on whether the switch 720 is turned on or off, mutual resonance may occur. The modulator 780 may demodulate data, based on whether the mutual resonance occurs.

The demodulator 790 may demodulate data received from a wireless energy transmitter, based on whether mutual resonance occurs between a source resonator (not illustrated) and the target resonator 710 by the wireless energy transmitter. In another example, the demodulator 790 may demodulate data received from the wireless energy transmitter, based on an amount of energy stored in the target resonator 710 for a symbol interval.

Figure 8:
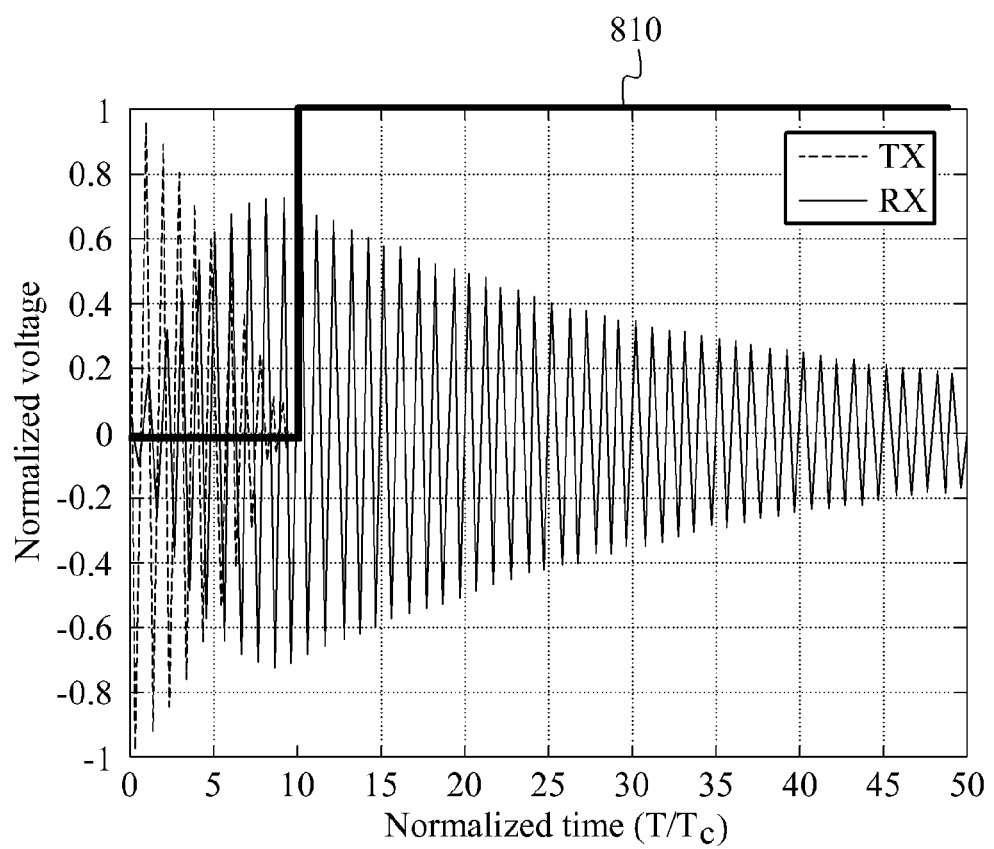
FIG. 8 is a graph illustrating an example of a change in voltage applied to a TX end and an RX end, within a single symbol in which synchronization matching is performed, in a wireless energy transmission system.

FIG. 8 illustrates an example of a change in voltage applied to a TX end and an RX end, within a single symbol in which synchronization matching is performed, in a wireless energy transmission system.

An RI system may transfer a signal, based on an operation of an analog switch of a TX end, and an operation of an analog switch of an RX end. To transmit and receive energy and/or information, the operations of the analog switches may be synchronized between the TX end and the RX end. To synchronize the operations of the analog switches, the RX end may analyze a signal of an energy transmission channel, and may estimate a start point of a signal transmitted by the TX end.

Synchronization mismatching may occur over time, for example, due to an error occurring in a clock system of the TX end and a clock system of the RX end, despite synchronization of symbols between the TX end and the RX end. For example, a typical clock system may have a clock error in parts per million (ppm). In the TX end and the RX end, a main clock may be assumed to be 72 MHz and a clock error may be assumed to be 20 ppm. The clock system of the TX end may be used to form a resonant frequency of a source resonator in the TX end, and the clock system of the RX end may be used to form a resonant frequency of a target resonator in the RX end.

For example, when a resonant frequency of 13.56 MHz is used, and when a $50^{th}$ resonance period is assumed, a symbol duration may be 3.69 us. In a clock system of 72 MHz and 20 ppm, a clock error corresponding to 72.000020 MHz and 71.999980 MHz may occur, which may indicate occurrence of an error of 7.7 femtoseconds (fs) per clock period. An error time of 2.05 picoseconds (ps) may be calculated in a symbol duration. In an example in which synchronization mismatching of a single resonance period is defined to be a "synchronization difference," and a time of 133 ms corresponding to 35982 symbols elapses, synchronization mismatching may occur.

For example, when a predetermined period of time elapses after synchronization matching, re-matching or correction of synchronization may be performed. The re-matching may indicate re-performing matching in the RX end. To reduce complexity and power consumption of the RX end, a wireless energy transmitter may correct synchronization after synchronization matching.

FIG. 8 illustrates a symbol in which synchronization matching is performed. In FIG. 8, a bold line 810 represents the operation of the switch of the RX end. The RX end may maintain the switch as off in an initial stage, to guarantee mutual resonance. When a maximum amount of energy is induced to the target resonator, for example in a $10^{th}$ resonance period, the RX end may capture energy by turning the switch on. Additionally, a dotted line and a solid line of FIG. 8 represent an AC voltage signal induced to the source resonator, and an AC voltage signal induced to the target resonator, respectively.

Figure 9:
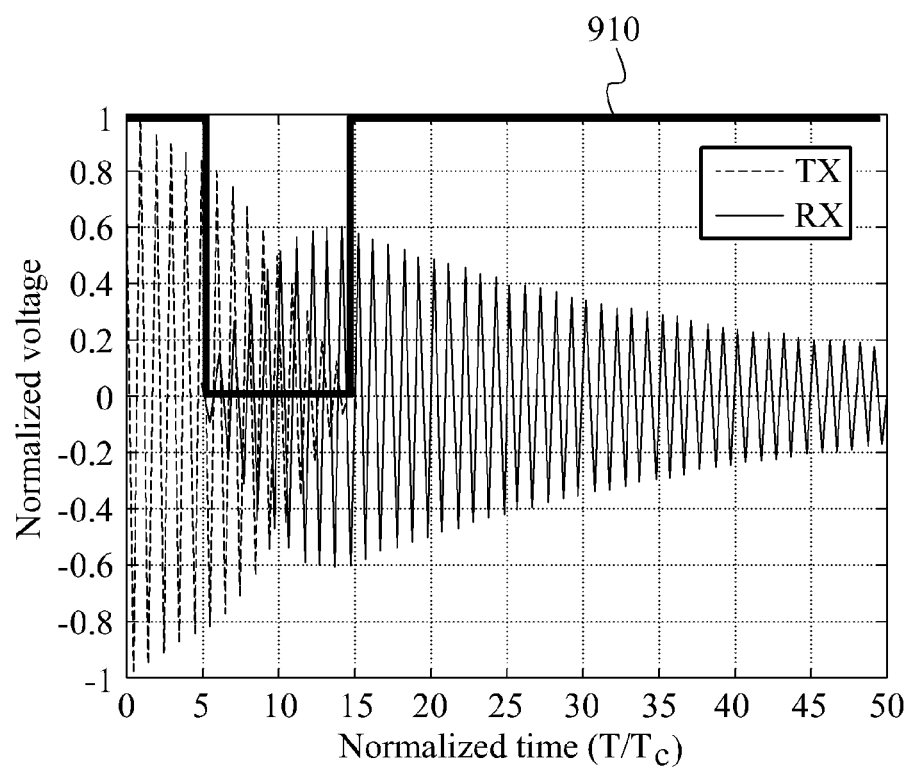
FIGS. 9 and 10 are graphs illustrating examples of a change in voltage applied to a TX end and an RX end, within a single symbol in which synchronization matching is not performed, in a wireless energy transmission system.
Figure 10:
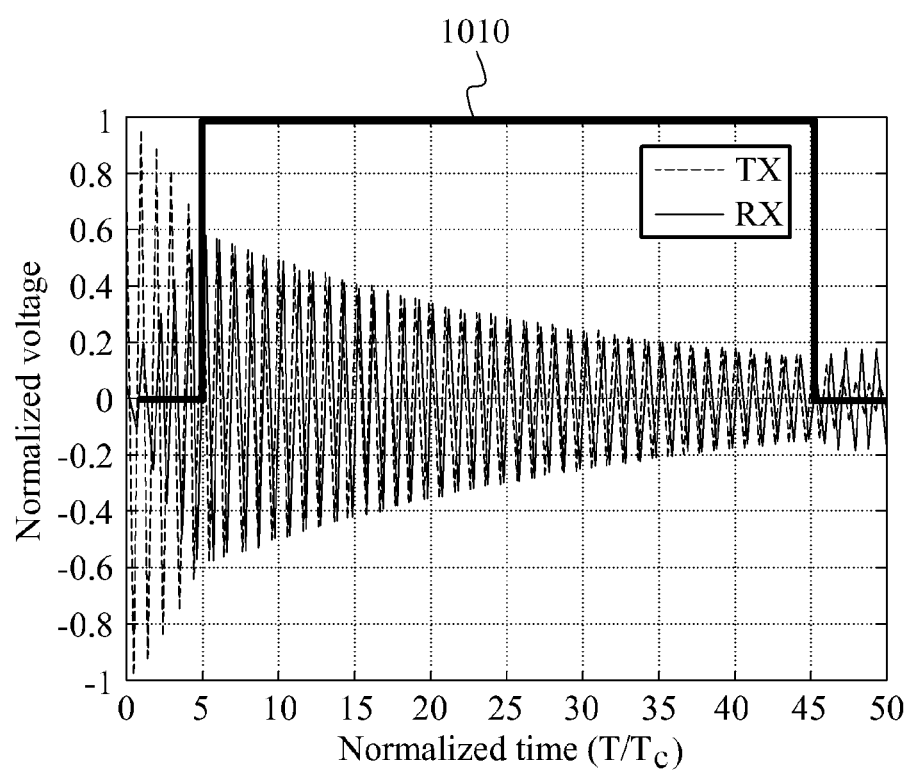

FIGS. 9 and 10 illustrate examples of a change in voltage applied to a TX end and an RX end, within a single symbol in which synchronization matching is not performed, in a wireless energy transmission system.

In FIGS. 9 and 10 synchronization mismatching occurs when a predetermined period of time elapses after synchronization matching in the RX end. In FIG. 9, a clock frequency of a clock system of the TX end is higher than a clock frequency of a clock system of the RX end. In FIG. 10, a clock frequency of a clock system of the TX end is lower than a clock frequency of a clock system of the RX end.

When the clock frequency of the TX end is not identical to the clock frequency of the RX end, clock differences may be accumulated. When a predetermined period of time elapses, shapes of graphs of FIGS. 9 and 10 may be shown.

Referring to FIGS. 9 and 10, an AC voltage signal induced through a source resonator is different from the AC voltage signal of FIG. 8. Additionally, bold lines 910 and 1010, each representing an operation of a switch of the RX end, are also different from the bold line 810 of FIG. 8. Accordingly, a change in the operation of the switch is shown. A wireless energy transmitter may estimate a change in voltage induced through a source resonator within a single symbol, and may correct synchronization.

Figure 11:
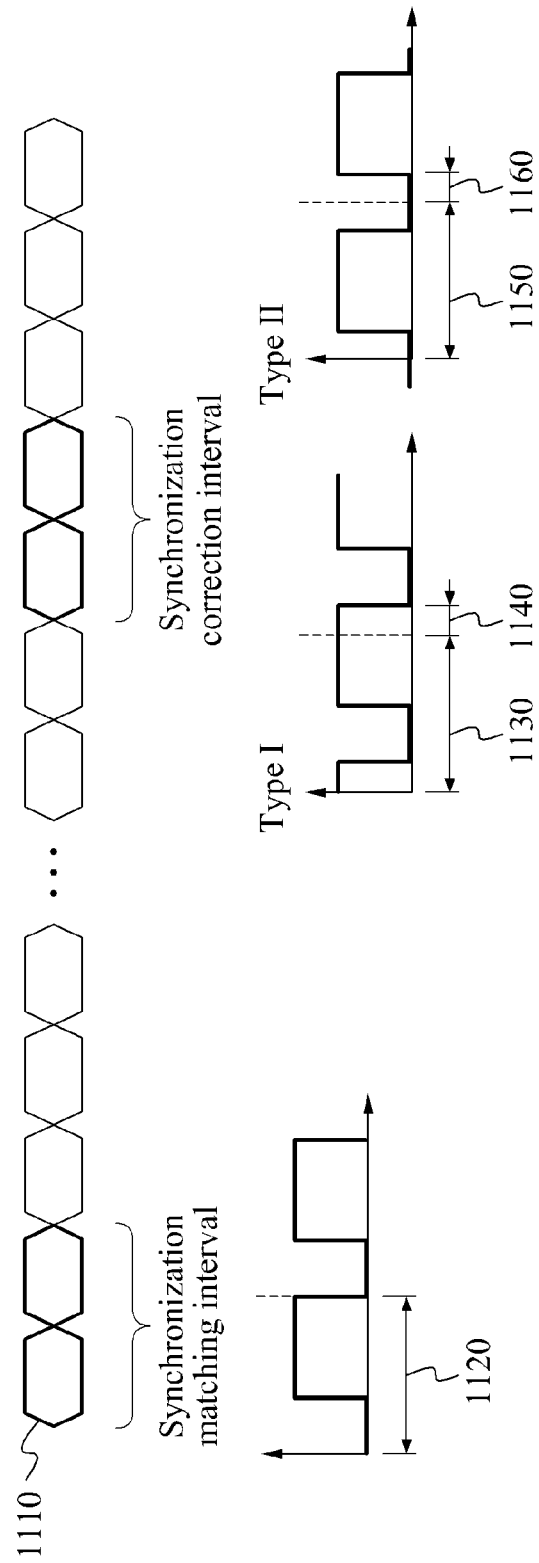
FIG. 11 is a diagram illustrating an example of a point in time at which synchronization is to be corrected after synchronization matching, in a wireless energy transmission system.

FIG. 11 illustrates an example of a point in time at which synchronization is to be corrected after synchronization matching, in a wireless energy transmission system. In FIG. 11, a synchronization matching interval refers to an interval in which synchronization matching is performed, and a synchronization correction interval refers to an interval correction of synchronization is required due to synchronization mismatching.

Referring to FIG. 11, when synchronization matching is performed in an RX end in initial energy transmission, the wireless energy transmission system may transmit energy during a set period of time. A clock system of the wireless energy transmission system may provide a clock 1110 to a TX end and the RX end. A symbol duration 1120, in which synchronization matching is performed in the RX end in initial energy transmission, may be adjusted based on synchronization correction.

For example, when a predetermined period of time elapses, the TX end may estimate a change in voltage that is induced to a source resonator within a single symbol, and may correct synchronization. Situations in which synchronization mismatching occurs may be classified into two types, for example, type I and type II of FIG. 11. In this example, type I indicates an example in which a clock frequency of the TX end is higher than a clock frequency of the RX end, and the type II indicates an example in which the clock frequency of the RX end is higher than the clock frequency of the TX end.

To correct synchronization, a symbol duration 1130 may be increased by a time 1140 in the type I, and a symbol duration 1150 may be reduced by a time 1160 in the type II. The symbol durations 1130 and 1150 may be increased or reduced, by adjusting a point in time at which a switch in the TX end is turned on and off.

Figure 12:
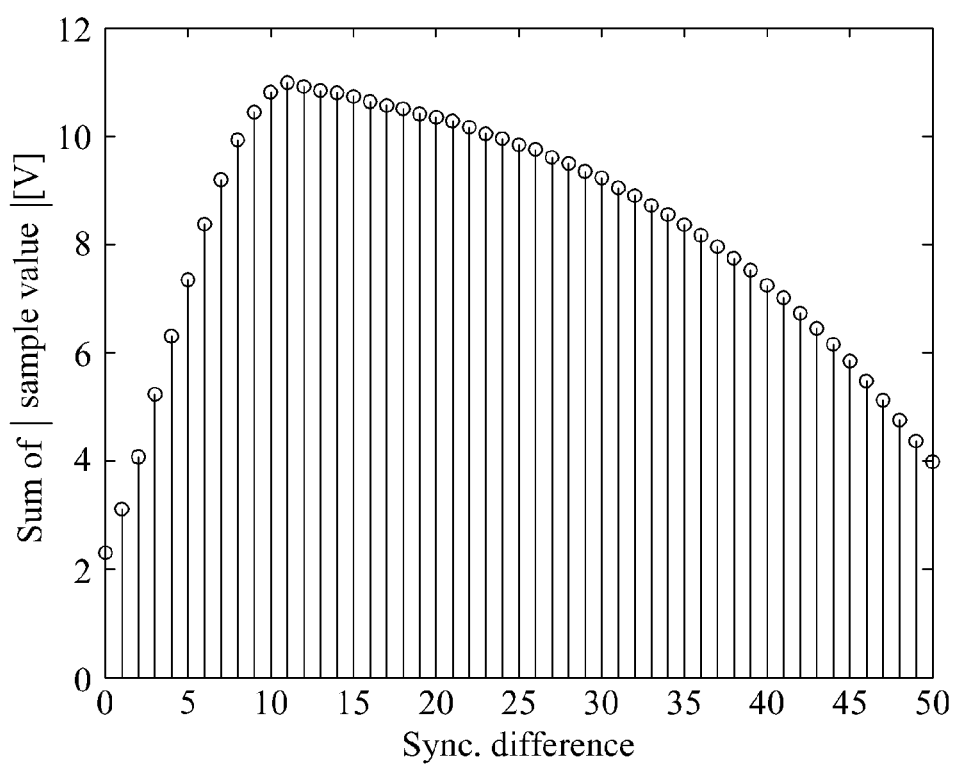
FIGS. 12 and 13 are graphs illustrating examples of a sum of absolute values of samples in a single symbol based on a synchronization change, in a wireless energy transmitter.
Figure 13:
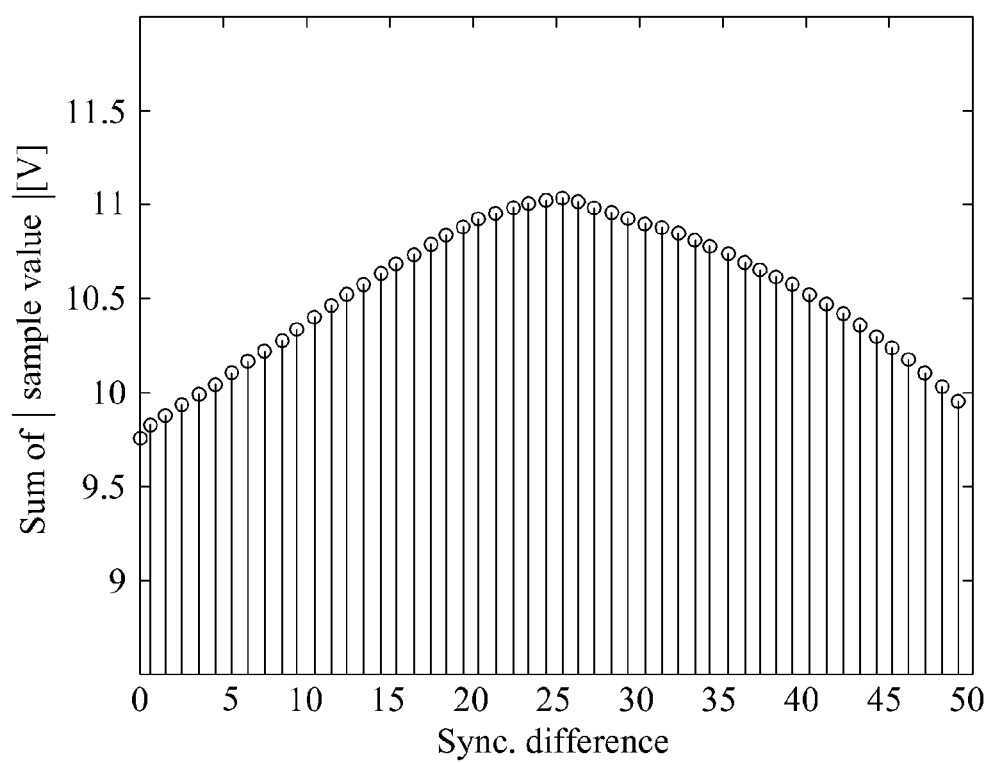

FIGS. 12 and 13 illustrate examples of a sum of absolute values of samples in a symbol based on a synchronization change, in a wireless energy transmitter.

To correct synchronization, the wireless energy transmitter may use a value calculated using the following Equation 3:

$$S = \sum_{i=1}^{sample\_num} |ADC\_sample[i]| \quad \text{[Equation 3]}$$

In Equation 3, S denotes a sum of absolute values of samples in a single symbol. A value of the sum S may be determined based on a change in synchronization matching. For example, it may be observed that a sum of absolute values of samples of the AC voltage signal of FIG. 9 is different from a sum of absolute values of samples of the AC voltage signal of FIG. 10.

When synchronization mismatching occurs, voltage induced to the TX end may be changed within a single symbol. The wireless energy transmitter may perform sampling to obtain samples from an induced voltage signal, may accumulate voltage values of the samples, and may determine a level of the synchronization mismatching.

FIGS. 12 and 13 illustrate the value of the sum S based on the level of the synchronization mismatching after synchronization matching. In FIG. 12, strong mutual resonance occurs between the TX end and the RX end. In contrast, in FIG. 13, weak mutual resonance occurs between the TX end and the RX end. In the examples of FIGS. 12 and 13, when synchronization matching is performed, for example, when synchronization difference has a value of "0," the sum S may have a smallest value, because the RX end may capture a maximum amount of energy during synchronization matching.

Due to an increase in the synchronization difference, the sum S may have a large value, in comparison to the synchronization matching. For example, when the synchronization difference continues to increase, the sum S may reach a maximum value, and may then be reduced. Accordingly, a value of the sum S in synchronization mismatching may be greater than a value of the sum S in synchronization matching.

Figure 14:
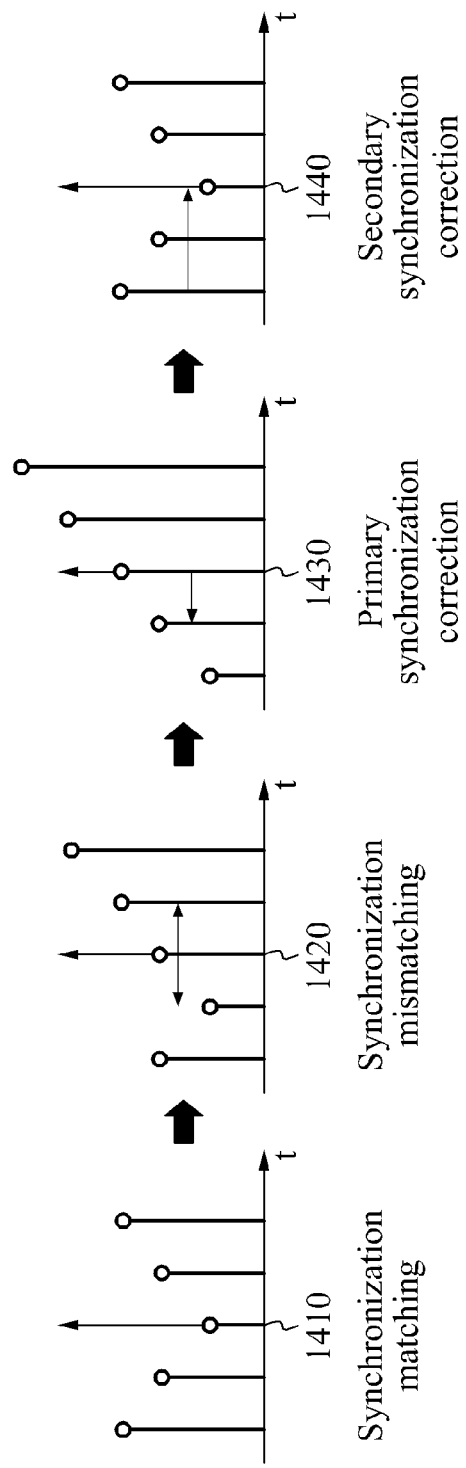
FIGS. 14 through 16 are diagrams illustrating examples of an operation of correcting synchronization in a wireless energy transmitter.
Figure 15:
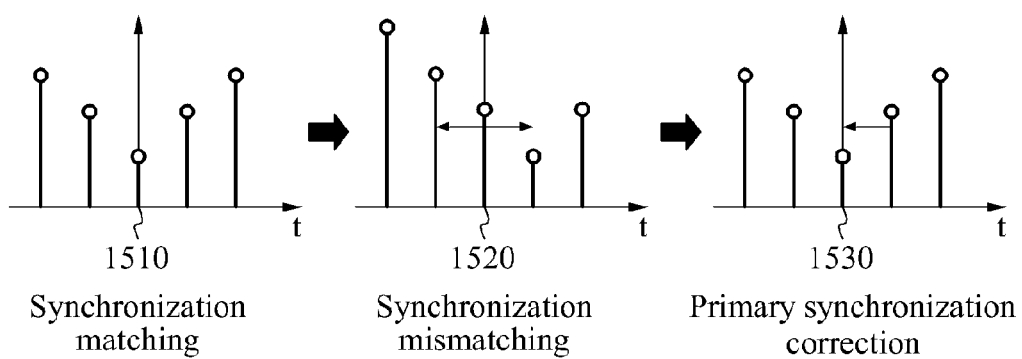
Figure 16:
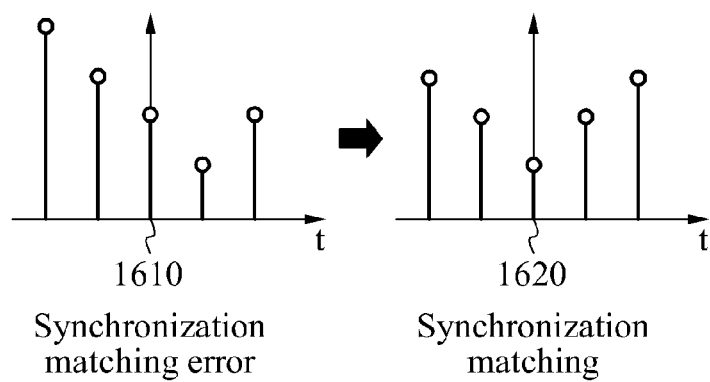

FIGS. 14 through 16 illustrate examples of correcting synchronization in a wireless energy transmitter.

FIG. 14 illustrates an example in which a clock frequency of a TX end is higher than a clock frequency of an RX end. Hereinafter, S1 and S2 refer to a sum of absolute values of samples in a single symbol that is calculated using Equation 3. First, synchronization matching is performed. The sum S1 measured in a symbol interval 1410 may have a minimum value. When a predetermined period of time elapses, synchronization mismatching may occur. For example, when a predetermined period of time elapses, and when the sum S2 is measured in a symbol interval 1420, the sum S2 may have a value greater than a value of the sum S1 measured in the synchronization matching. However, if the sum S2 is greater than the sum S1, the wireless energy transmitter may not determine which system is operated at a higher clock frequency, because when clock frequencies are not matched, the sum S2 is greater than the sum S1 in all systems.

For example, when the clock frequency of the TX end is assumed to be lower than the clock frequency of the RX end, the wireless energy transmitter may correct synchronization. In this example, the correcting of the synchronization may indicate reducing a symbol duration, for example, reducing a time during which a switch of the TX end is maintained as on, and a time in which the switch is maintained as off.

Additionally, when primary synchronization correction is performed, a value of a sum S3 may be measured in a symbol interval 1430. The wireless energy transmitter may determine the clock frequency of the TX end to be lower than the clock frequency of the RX end, and may correct synchronization, despite the clock frequency of the TX end being higher than the clock frequency of the RX end. Accordingly, the sum S3 may have a value greater than the value of the sum S2.

When the value of the sum S3 is greater than the value of the sum S2 after the primary synchronization correction, the wireless energy transmitter may perform secondary synchronization correction. In this example, the wireless energy transmitter may increase a symbol duration. For example, the symbol duration may be increased by an amount of time obtained by doubling a time reduced in the primary synchronization correction. When the secondary synchronization correction is performed, synchronization matching may be re-performed in a symbol interval 1440.

FIG. 15 illustrates an example in which a clock frequency of a TX end is lower than a clock frequency of an RX end. As described above, S1 and S2 each refer to a sum of absolute values of samples in a single symbol that is calculated using Equation 3. First, synchronization matching is performed. The sum S1 measured in a symbol interval 1510 may have a minimum value. When a predetermined period of time elapses, synchronization mismatching may occur. For example, when a predetermined period of time elapses, and the sum S2 is measured in a symbol interval 1520, the sum S2 may have a value that is greater than a value of the sum S1 measured in the synchronization matching. However, if the sum S2 is greater than the sum S1, the wireless energy transmitter may not determine which system is operated at a higher clock frequency, because when clock frequencies are not matched, the sum S2 is greater than the sum S1 in all systems.

Similarly to the example of FIG. 14, when the clock frequency of the TX end is assumed to be lower than the clock frequency of the RX end, the wireless energy transmitter may perform primary synchronization correction. In this example, synchronization correction may reduce a symbol duration, for example, reduce a time in which a switch of the TX end is maintained as on, and a time in which the switch is maintained as off. Additionally, when the primary synchronization correction is performed, a value of a sum S3 may be measured during a symbol interval 1530.

In the example of FIG. 15, the clock frequency of the TX end is lower than the clock frequency of the RX end, and accordingly only the primary synchronization correction may be performed. Because the sum S3 is less than the sum S2, the wireless energy transmitter may determine synchronization correction to be performed in a correct direction, and may terminate the synchronization correction.

FIG. 16 illustrates an example in which synchronization matching is incompletely performed in an initial RX end. For example, when a value of the sum S2 initially measured in a symbol interval 1620 is less than a value of the sum S1 measured in a symbol interval 1610, the wireless energy transmitter may not perform a synchronization correction operation, because matching performed in a current time point is more accurate than matching performed in a matching time point.

Figure 17:
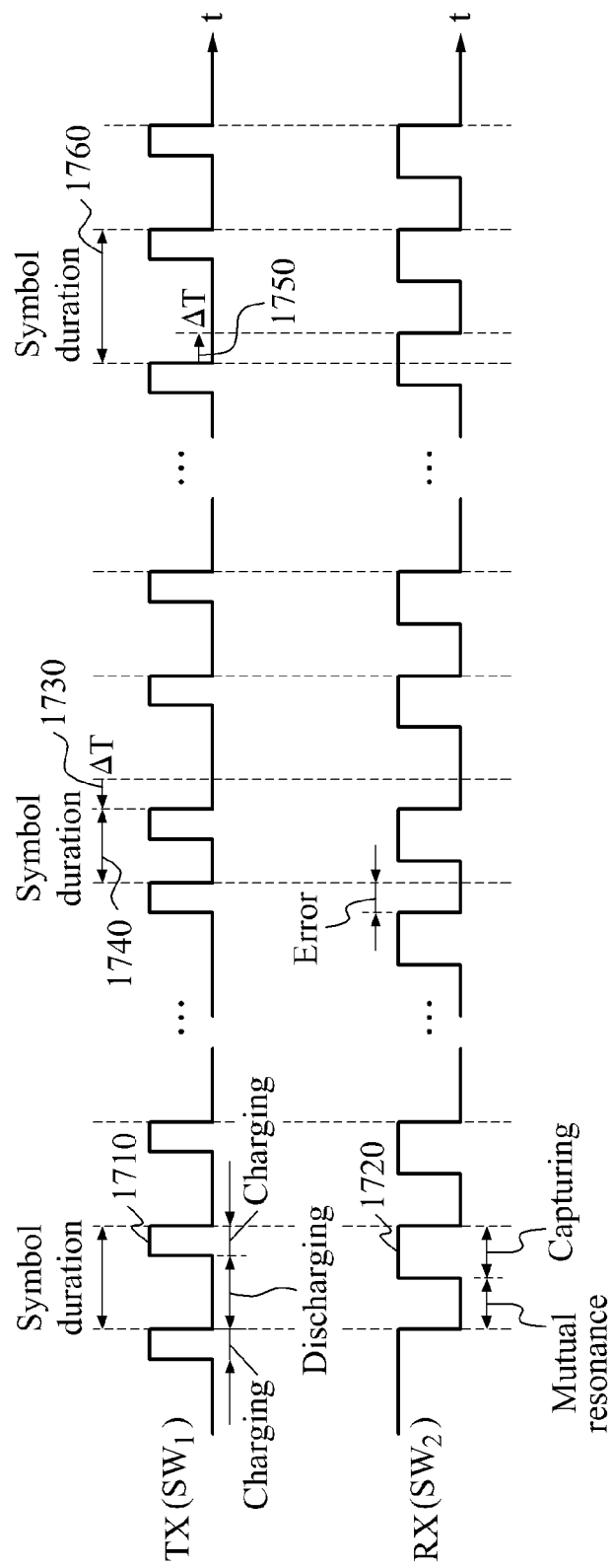
FIGS. 17 through 19 are diagrams illustrating examples of an operation of adjusting a turn-on timing and a turn-off timing of a switch, to correct synchronization in a wireless energy transmitter.
Figure 18:
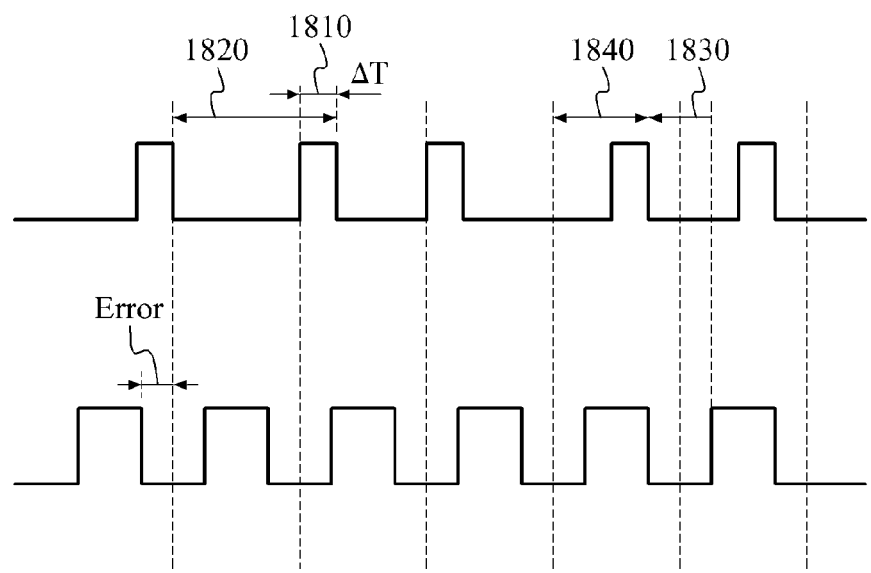
Figure 19:
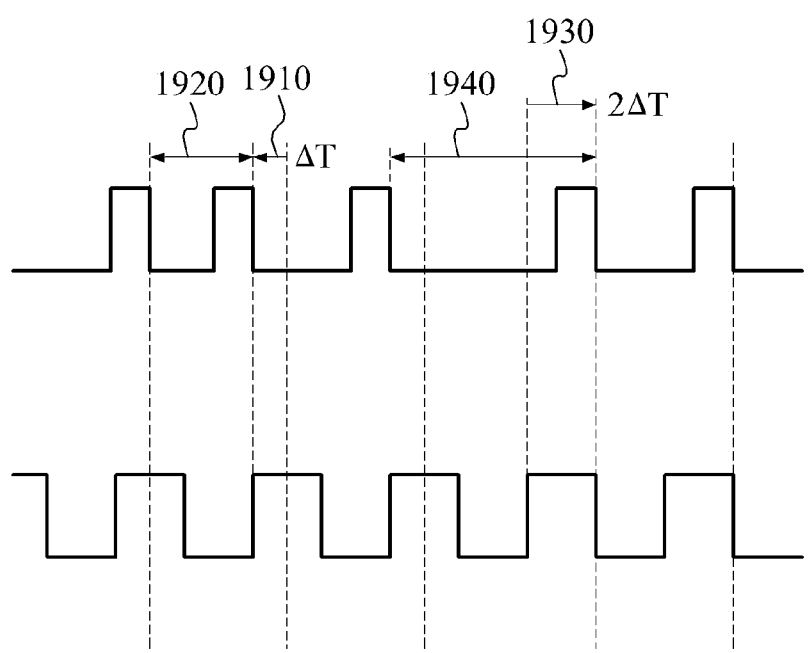

FIGS. 17 through 19 illustrate examples of an operation of adjusting a turn-on timing and a turn-off timing of a switch, to correct synchronization in a wireless energy transmitter.

Referring to FIG. 17, matching of symbol synchronization may be performed in an RX end. When synchronization matching is performed, a timing 1710 in which a switch $SW_1$ of a TX end is turned off may be matched to a timing 1720 in which a switch $SW_2$ of the RX end is turned off. However, when synchronization mismatching starts to occur after a predetermined period of time, the timing 1710 may not match the timing 1720.

In a symbol interval, the timing 1710 may not match the timing 1720, which indicates a time at which synchronization mismatching occurs.

The wireless energy transmitter may control a turn-on timing and turn-off timing of the switch $SW_1$, and may match the turn-off timing of the switch $SW_1$ to a turn-off timing of the switch $SW_2$. Additionally, the wireless energy transmitter may adjust a symbol duration, by controlling the turn-on timing and turn-off timing of the switch $SW_1$.

If a clock frequency of the RX end is higher than a clock frequency of the TX end, the wireless energy transmitter may match the turn-off timing of the switch $SW_1$ to a turn-off timing of the switch $SW_2$, by reducing the turn-on timing and turn-off timing of the switch $SW_1$ by $\Delta t$ 1730. Due to the reduction of $\Delta t$ 1730 in the turn-on timing and turn-off timing of the switch $SW_1$, a symbol duration 1740 may also be reduced by $\Delta t$ 1730.

In another example in which the clock frequency of the TX end is higher than the clock frequency of the RX end, the wireless energy transmitter may match the turn-off timing of the switch $SW_1$ to a turn-off timing of the switch $SW_2$, by increasing the turn-on timing and turn-off timing of the switch $SW_1$ by $\Delta t$ 1750. Due to an increase of $\Delta t$ 1750 in the turn-on timing and turn-off timing of the switch $SW_1$, a symbol duration 1760 may also be increased by $\Delta t$ 1750.

The wireless energy transmitter may correct synchronization in a single symbol interval. A symbol interval after correction may be maintained as a symbol duration that is set in advance.

Referring to FIG. 18, the wireless energy transmitter may detect synchronization mismatching, based on a sum of absolute values of samples of an AC signal that are induced through a source resonator. The wireless energy transmitter may determine that the turn-off timing of the switch $SW_1$ is not matched to the turn-off timing of the switch $SW_2$, based on the sum of the absolute values of the samples of the induced AC signal. In FIG. 18, a clock frequency of an RX end is higher than a clock frequency of a TX end.

When synchronization mismatching is detected, the wireless energy transmitter may increase or reduce the turn-on timing and turn-off timing of the switch $SW_1$, and may correct synchronization.

In an example in which the clock frequency of the TX end is higher than the clock frequency of the RX end, synchronization re-matching may be performed by increasing the turn-on timing and turn-off timing of the switch $SW_1$. In another example in which the clock frequency of the RX end is higher than a clock frequency of the TX end, synchronization re-matching may be performed by reducing the turn-on timing and turn-off timing of the switch $SW_1$.

However, because it may be difficult to determine whether the clock frequency of the TX end is higher or lower than the clock frequency of the RX end, the wireless energy transmitter may increase the turn-on timing and turn-off timing of the switch $SW_1$ by $\Delta t$ 1810. Due to the increase of $\Delta t$ 1810 in the turn-on timing and turn-off timing of the switch $SW_1$, a symbol duration 1820 may also be increased by $\Delta t$ 1810.

When primary synchronization correction is performed, the wireless energy transmitter may determine that the turn-off timing of the switch $SW_1$ has not yet been matched to the turn-off timing of the switch $SW_2$. For example, the wireless energy transmitter may determine that the primary synchronization correction is performed in a wrong direction, and may perform secondary synchronization correction in an opposite direction to the primary synchronization correction. Accordingly, the wireless energy transmitter may reduce the turn-on timing and turn-off timing of the switch $SW_1$ by $\Delta t$ 1830. In this example, $\Delta t$ 1830 may be twice that of $\Delta t$ 1810. By reducing by $\Delta t$ 1830 the turn-on timing and turn-off timing of the switch $SW_1$, a symbol duration 1840 may also be reduced by $\Delta t$ 1830.

When the secondary synchronization correction is performed, the wireless energy transmitter may determine that the turn-off timing of the switch $SW_1$ has been matched to the turn-off timing of the switch $SW_2$.

FIG. 19 illustrates an example in which a clock frequency of a TX end is higher than a clock frequency of an RX end.

Referring to FIG. 19, it may be difficult to determine whether the clock frequency of the TX end is higher or lower than the clock frequency of the RX end. Accordingly, the wireless energy transmitter may reduce the turn-on timing and turn-off timing of the switch $SW_1$ by $\Delta t$ 1910. Due to a reduction of $\Delta t$ 1910 in the turn-on timing and turn-off timing of the switch $SW_1$, a symbol duration 1920 may also be reduced by $\Delta t$ 1910.

When primary synchronization correction is performed, the wireless energy transmitter may determine that the turn-off timing of the switch $SW_1$ has not yet been matched to the turn-off timing of the switch $SW_2$. For example, the wireless energy transmitter may determine that the primary synchronization correction is performed in a wrong direction, and may perform secondary synchronization correction in an opposite direction to the primary synchronization correction. Accordingly, the wireless energy transmitter may increase, by $\Delta t$ 1930, the turn-on timing and turn-off timing of the switch $SW_1$. In this example, $\Delta t$ 1930 may be twice longer than $\Delta t$ 1910 to overcome the incorrect direction. Due to an increase, by $\Delta t$ 1930, the turn-on timing and turn-off timing of the switch $SW_1$, a symbol duration 1940 may also be increased by $\Delta t$ 1930.

When the secondary synchronization correction is performed, the wireless energy transmitter may determine that the turn-off timing of the switch $SW_1$ is matched to the turn-off timing of the switch $SW_2$.

Figure 20:
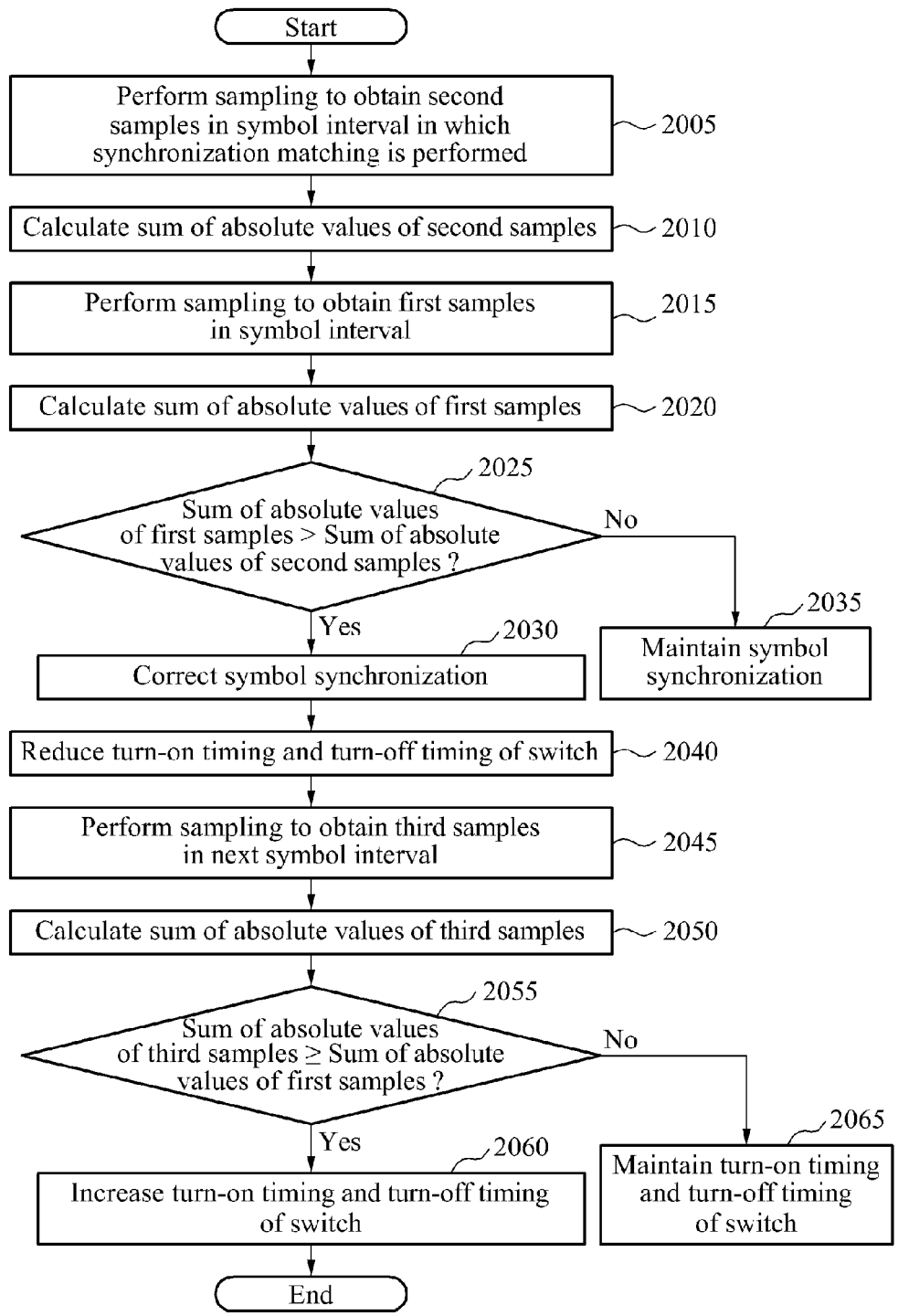
FIG. 20 is a diagram illustrating an example of a wireless energy transmission method.

FIG. 20 illustrates an example of a wireless energy transmission method.

Referring to FIG. 20, in 2005, a wireless energy transmitter performs sampling to obtain second samples in a symbol interval in which synchronization matching is performed. For example, the synchronization matching may be performed in an energy RX end. The wireless energy transmitter may perform sampling to obtain second samples from an AC signal induced to a source resonator. In 2010, the wireless energy transmitter calculates a sum of absolute values of the second samples.

In 2015, the wireless energy transmitter performs sampling to obtain first samples in a symbol interval after synchronization matching is performed. For example, the wireless energy transmitter may perform sampling to obtain the first samples, for each symbol interval in real time. As another example, the wireless energy transmitter may perform sampling to obtain the first samples in a symbol interval when a set period of time elapses. As another example, the wireless energy transmitter may perform sampling to obtain the first samples in a symbol interval when a random period of time elapses. The wireless energy transmitter may perform sampling to obtain first samples from the AC signal induced to the source resonator.

In 2020, the wireless energy transmitter calculates a sum of absolute values of the first samples. In 2025, the wireless energy transmitter determines whether the sum of the absolute values of the first samples is greater than the sum of the absolute values of the second samples.

For example, if the sum of the absolute values of the first samples is determined to be greater than the sum of the absolute values of the second samples, the wireless energy transmitter determines that synchronization mismatching occurs, and determines to correct symbol synchronization in 2030.

In another example, if the sum of the absolute values of the first samples is determined to be less than or equal to the sum of the absolute values of the second samples, the wireless energy transmitter determines that the synchronization matching is maintained, and determines to maintain the symbol synchronization in 2035.

In 2040, the wireless energy transmitter reduces a turn-on timing and a turn-off timing of a switch. In 2045, the wireless energy transmitter performs sampling to obtain third samples during a next symbol interval, when the turn-on timing and turn-off timing are reduced. In 2050, the wireless energy transmitter calculates a sum of absolute values of the third samples. In 2055, the wireless energy transmitter determines whether the sum of the absolute values of the third samples is greater than or equal to the sum of the absolute values of the first samples.

For example, if the sum of the absolute values of the third samples is determined to be greater than or equal to the sum of the absolute values of the first samples, the wireless energy transmitter determines that synchronization mismatching still occurs, and increases the turn-on timing and the turn-off timing of the switch in 2060.

As another example, if the sum of the absolute values of the third samples is determined to be less than the sum of the absolute values of the first samples, the wireless energy transmitter maintains the turn-on timing and the turn-off timing of the switch in 2065, because the synchronization matching has occurred.

Figure 21:
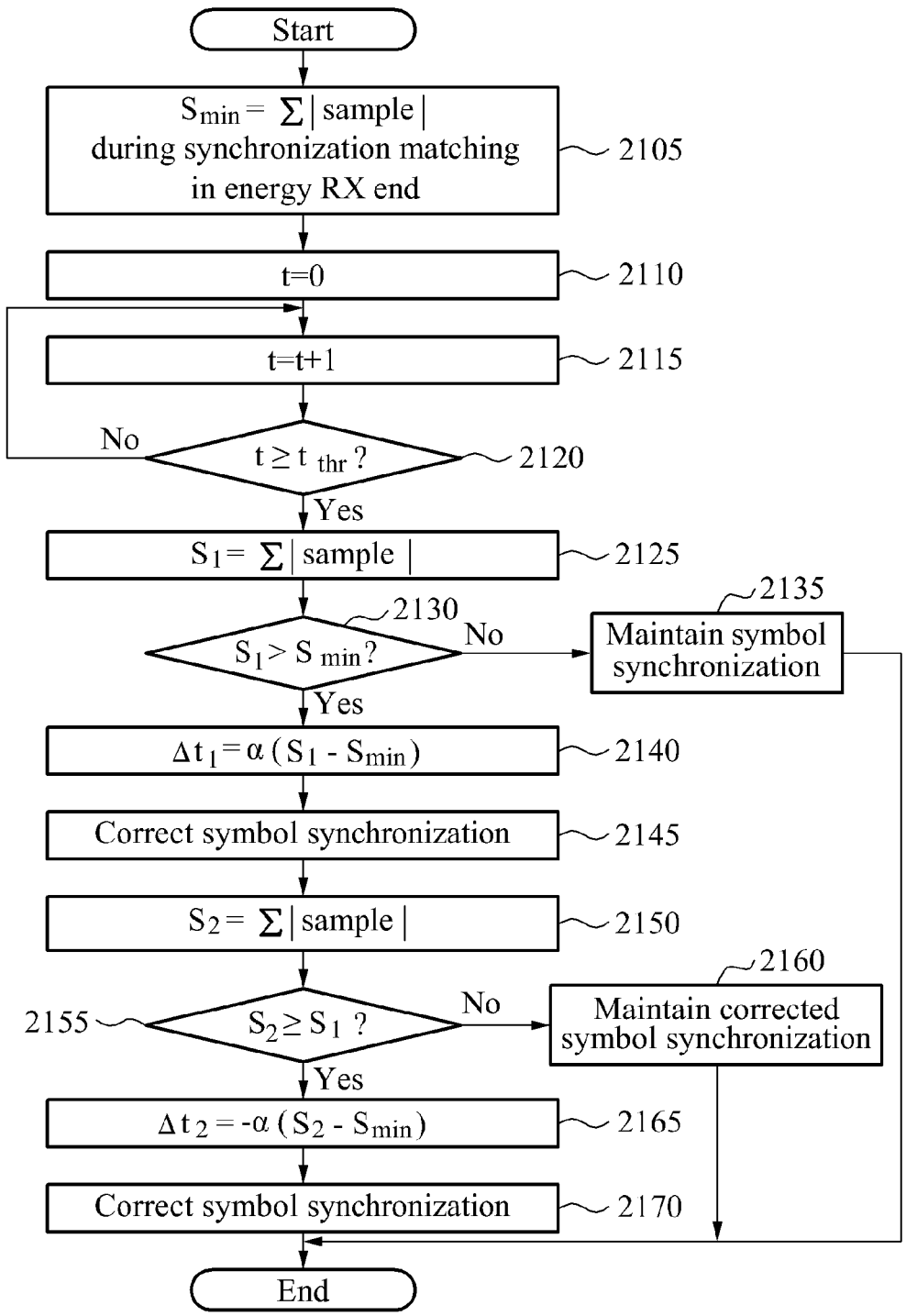
FIG. 21 is a diagram illustrating another example of a wireless energy transmission method.

FIG. 21 illustrates another example of a wireless energy transmission method.

Referring to FIG. 21, in 2105, a wireless energy transmitter calculates a sum $S_{min}$ of absolute values of samples that are sampled in a symbol interval, during synchronization matching in an energy RX end.

In 2110, the wireless energy transmitter initializes a time t to "0" in a symbol interval in which synchronization matching is performed. In 2115, the wireless energy transmitter counts the time t. In 2120, the wireless energy transmitter determines whether the time t is equal to or longer than a predetermined time $t_{thr}$. In this example, the predetermined time $t_{thr}$ may refer to a time at which sampling is determined to be performed in a symbol interval.

In an example in which the time t is equal to or longer than the predetermined time $t_{thr}$, the wireless energy transmitter performs sampling to obtain samples from an AC signal induced to a source resonator in a symbol interval including the predetermined time $t_{thr}$, and calculates a sum $S_1$ of absolute values of the samples in 2125.

In 2130, the wireless energy transmitter determines whether the sum $S_1$ is greater than the sum $S_{min}$. For example, if the sum $S_1$ is determined to be less than or equal to the sum $S_{min}$, the wireless energy transmitter maintains the current symbol synchronization in 2135.

As another example, if the sum $S_1$ is determined to be greater than the sum $S_{min}$, the wireless energy transmitter determines that synchronization correction is to be performed, and estimates a correction time $\Delta t_1$ based on a proportional control in 2140. The correction time $\Delta t_1$ may have a value in proportion to a difference between the sums $S_1$ and $S_{min}$.

In 2145, the wireless energy transmitter corrects symbol synchronization by the correction time $\Delta t_1$. For example, a symbol duration may be reduced by the correction time $\Delta t_1$.

In 2150, the wireless energy transmitter performs sampling to obtain samples from the AC signal that are induced to the source resonator after a single symbol interval, and calculates a sum $S_2$ of absolute values of the samples.

In 2155, the wireless energy transmitter determines whether the sum $S_2$ is greater than or equal to the sum $S_1$. For example, if the sum $S_2$ is determined to be less than the sum $S_1$, the wireless energy transmitter maintains the corrected symbol synchronization in 2160.

As another example, if the sum $S_2$ is determined to be greater than or equal to the sum $S_1$, the wireless energy transmitter determines that synchronization correction is to be performed, and estimates a correction time $\Delta t_2$ based on a proportional control in 2165. In this example, the correction time $\Delta t_2$ may have a value in proportion to a difference between the sums $S_2$ and $S_{min}$. Additionally, the correction time $\Delta t_2$ may have an opposite direction to the correction time $\Delta t_1$ estimated in 2140.

In 2170, the wireless energy transmitter corrects the symbol synchronization by the correction time $\Delta t_2$. For example, a symbol duration may be increased by the correction time $\Delta t_2$.

According to various aspects, a wireless energy transmitter may correct symbol synchronization. Accordingly, it is possible to reduce a calculation amount required for synchronization matching in an energy RX end. Thus, in a wireless energy transmission system, calculation complexity of the energy RX end may be reduced.

Furthermore, by reducing the calculation complexity of the energy RX end, an amount of power consumed in the energy RX end may be reduced. Due to a reduction in the calculation amount of the energy RX end, an effect of reducing power consumption may be obtained.

Program instructions to perform a method described herein, or one or more operations thereof, may be recorded, stored, or fixed in one or more computer-readable storage media. The program instructions may be implemented by a computer. For example, the computer may cause a processor to execute the program instructions. The media may include, alone or in combination with the program instructions, data files, data structures, and the like. Examples of computer-readable storage media include magnetic media, such as hard disks, floppy disks, and magnetic tape; optical media such as CD ROM disks and DVDs; magneto-optical media, such as optical disks; and hardware devices that are specially configured to store and perform program instructions, such as read-only memory (ROM), random access memory (RAM), flash memory, and the like. Examples of program instructions include machine code, such as produced by a compiler, and files containing higher level code that may be executed by the computer using an interpreter. The program instructions, that is, software, may be distributed over network coupled computer systems so that the software is stored and executed in a distributed fashion. For example, the software and data may be stored by one or more computer readable storage mediums. Also, functional programs, codes, and code segments for accomplishing the example embodiments disclosed herein can be easily construed by programmers skilled in the art to which the embodiments pertain based on and using the flow diagrams and block diagrams of the figures and their corresponding descriptions as provided herein. Also, the described unit to perform an operation or a method may be hardware, software, or some combination of hardware and software. For example, the unit may be a software package running on a computer or the computer on which that software is running.

According to various aspects, the target resonator may be or may be included in a terminal, for example, a mobile phone, a computer, an RFID, a NFC device, a sensor, an appliance, and the like. The source resonator supply power to the target resonator so that the device corresponding to the target resonator may charge a battery, and the like, without plugging in to a power source using a cable.

As a non-exhaustive illustration only, a terminal/device/unit described herein may refer to mobile devices such as a cellular phone, a personal digital assistant (PDA), a digital camera, a portable game console, and an MP3 player, a portable/personal multimedia player (PMP), a handheld e-book, a portable laptop PC, a global positioning system (GPS) navigation, a tablet, a sensor, and devices such as a desktop PC, a high definition television (HDTV), an optical disc player, a setup box, a home appliance, and the like that are capable of wireless communication or network communication consistent with that which is disclosed herein.

A number of examples have been described above. Nevertheless, it will be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A wireless energy transmitter, comprising:
   a sampling unit configured to obtain first samples from an alternating current (AC) signal during a first symbol interval, the AC signal being induced at an energy transmission (TX) end, and the first symbol interval being used to transmit energy from the energy TX end to an energy reception (RX) end; and
   a correcting unit configured to correct symbol synchronization based on a difference between a sum of absolute values of the first samples and a sum of absolute values of second samples that are obtained during a second symbol interval in which synchronization matching is performed between a switch of the energy TX end and a switch of the energy RX end.

2. The wireless energy transmitter of claim 1, further comprising:
   a controller configured to determine whether the symbol synchronization is to be corrected based on a comparison of the sum of the absolute values of the first samples and the sum of the absolute values of the second samples.

3. The wireless energy transmitter of claim 2, wherein the controller comprises:
   a calculating unit configured to calculate the sum of the absolute values of the first samples and the sum of the absolute values of the second samples; and
   a comparing unit configured to compare the sum of the absolute values of the first samples with the sum of the absolute values of the second samples.

4. The wireless energy transmitter of claim 2, wherein, in response to the sum of the absolute values of the first samples being greater than the sum of the absolute values of the second samples, the controller determines to correct the symbol synchronization.

5. The wireless energy transmitter of claim 2, wherein, in response to the sum of the absolute values of the first samples being less than or equal to the sum of the absolute values of the second samples, the controller determines to maintain the symbol synchronization.

6. The wireless energy transmitter of claim 1, wherein the correcting unit controls a turn-on timing and a turn-off timing of the switch of the energy TX end, based on the difference between the sum of the absolute values of the first samples and the sum of the absolute values of the second samples.

7. The wireless energy transmitter of claim 2, wherein the correcting unit reduces a turn-on timing and a turn-off timing of the switch of the energy TX end, for a single symbol interval, based on the difference between the sum of the absolute values of the first samples and the sum of the absolute values of the second samples, and
   the controller determines whether the reduced turn-on timing and the reduced turn-off timing are to be corrected, based on a comparison of the sum of the absolute values of the first samples and a sum of absolute values of third samples that are obtained from the AC signal during a next symbol interval.

8. The wireless energy transmitter of claim 7, wherein, in response to the sum of the absolute values of the third samples being greater than the sum of the absolute values of the first samples, the correcting unit increases the previously reduced turn-on timing and the reduced turn-off timing, based on a difference between the sum of the absolute values of the third samples and the sum of the absolute values of the second samples.

9. The wireless energy transmitter of claim 1, further comprising:
   a source resonator configured to transmit energy to the energy RX end through mutual resonance between the source resonator and a target resonator of the energy RX end;
   a power source configured to supply energy to the source resonator; and
   a switch configured to electrically connect and disconnect the power source to and from the source resonator.

10. The wireless energy transmitter of claim 9, further comprising:
    a modulator configured to modulate data based on a turning on and off of the switch; and
    a demodulator configured to demodulate data received from the energy RX end based on whether the mutual resonance occurs at the energy RX end.

11. A wireless energy transmission system, comprising:
    a wireless energy transmitter configured to
      transmit energy through mutual resonance between a source resonator and a target resonator,
      obtain first samples from an AC signal induced at the source resonator, for each symbol interval,
      determine whether symbol synchronization is to be corrected based on a comparison of a sum of absolute values of the first samples and a sum of absolute values of second samples that are obtained during a second symbol interval in which synchronization matching is performed, and correct the symbol synchronization based on a difference between the sum of the absolute values of the first samples and the sum of the absolute values of the second samples; and a wireless energy receiver comprising the target resonator configured to receive energy transmitted by the source resonator through the mutual resonance, and to match the symbol synchronization based on values of samples of an AC signal induced at the target resonator.

12. The wireless energy transmission system of claim 11, wherein the wireless energy receiver comprises:

a sampling unit configured to perform sampling to obtain first samples from the AC signal induced at the target resonator, for each symbol interval; and a symbol synchronization matching unit configured to match a point in time at which one of the first samples has a largest absolute value as a symbol synchronization point in time.

13. The wireless energy transmission system of claim 12, wherein the wireless energy receiver further comprises:

a load that is charged with energy received by the target resonator;

a capacitor configured to change a resonant frequency of the target resonator, in response to the capacitor and the target resonator being connected to each other;

a switch configured to electrically connect and disconnect the target resonator to and from the load and the capacitor; and a switch controller configured to control an operation of the switch based on the symbol synchronization point in time.

14. The wireless energy transmission system of claim 13, wherein the wireless energy receiver further comprises:

a modulator configured to modulate data based on a turning on and off of the switch; and a demodulator configured to demodulate data received from the wireless energy transmitter based on whether the mutual resonance occurs at the wireless energy transmitter.

15. A wireless energy transmission method, comprising:

obtaining first samples from an alternating current (AC) signal during a first symbol interval, the AC signal being induced at an energy transmission (TX) end, and the first symbol interval being used to transmit energy from the energy TX end to an energy reception (RX) end; and correcting symbol synchronization based on a difference between a sum of absolute values of the first samples and a sum of absolute values of second samples that are sampled during a second symbol interval in which synchronization matching is performed between a switch of the energy TX end and a switch of the energy RX end.

16. The wireless energy transmission method of claim 15, further comprising:

obtaining the second samples from the AC signal prior to obtaining the first samples;

calculating the sum of the absolute values of the second samples;

calculating the sum of the absolute values of the first samples;

comparing the sum of the absolute values of the first samples with the sum of the absolute values of the second samples; and determining whether the symbol synchronization is to be corrected based on a result of the comparing.

17. The wireless energy transmission method of claim 16, wherein the determining comprises, in response to the sum of the absolute values of the first samples being greater than the sum of the absolute values of the second samples, determining to correct a turn-on timing and a turn-off timing of the switch of the energy TX end.

18. The wireless energy transmission method of claim 15, wherein the correcting comprises:

maintaining the turn-on timing and the turn-off timing, in response to the sum of the absolute values of the first samples being less than or equal to the sum of the absolute values of the second samples; and reducing the turn-on timing and the turn-off timing, in proportion to a difference between the sum of the absolute values of the first samples and the sum of the absolute values of the second samples, in response to the sum of the absolute values of the first samples being greater than the sum of the absolute values of the second samples.

19. The wireless energy transmission method of claim 18, further comprising:

obtaining third samples from the AC signal during a next symbol interval, in response to the turn-on timing and the turn-off timing being reduced;

calculating a sum of absolute values of the third samples;

comparing the sum of the absolute values of the third samples with the sum of the absolute values of the first samples;

determining to correct the turn-on timing and the turn-off timing, in response to the sum of the absolute values of the third samples being greater than or equal to the sum of the absolute values of the first samples; and increasing the turn-on timing and the turn-off timing, in proportion to a difference between the sum of the absolute values of the third samples and the sum of the absolute values of the second samples.

* * * * *